United States Patent
Sayed Hassan et al.

(10) Patent No.: US 12,494,948 B2
(45) Date of Patent: Dec. 9, 2025

(54) ENHANCED FRONTHAUL INTERFACE SPLIT USING DEMODULATION REFERENCE SIGNAL CHANNEL ESTIMATES

(71) Applicant: QUALCOMM Incorporated, San Diego, CA (US)

(72) Inventors: Mohamad Sayed Hassan, Paris (FR); Andrei Dragos Radulescu, La Jolla, CA (US); Srikant Jayaraman, San Diego, CA (US); Mark Wallace, Bedford, MA (US); Michael Francis Garyantes, Bradley Beach, NJ (US); Luca Blessent, Whitehouse Station, NJ (US); Rajat Prakash, San Diego, CA (US); Abhishek Saurabh Sachidanand Sinha, San Diego, CA (US); Jigneshkumar Shah, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 463 days.

(21) Appl. No.: 18/152,882

(22) Filed: Jan. 11, 2023

(65) Prior Publication Data
US 2023/0275784 A1   Aug. 31, 2023

Related U.S. Application Data

(60) Provisional application No. 63/268,648, filed on Feb. 28, 2022.

(51) Int. Cl.
*H04L 25/02* (2006.01)
*H04B 7/06* (2006.01)
(Continued)

(52) U.S. Cl.
CPC ....... *H04L 25/0202* (2013.01); *H04B 7/0617* (2013.01); *H04L 5/0048* (2013.01); *H04L 41/0803* (2013.01); *H04W 72/21* (2023.01)

(58) Field of Classification Search
None
See application file for complete search history.

(56) References Cited

U.S. PATENT DOCUMENTS

| 12,317,233 | B2 * | 5/2025 | Ganesan | H04W 72/56 |
| 2012/0062421 | A1 * | 3/2012 | Su | H04B 7/0417 342/373 |

(Continued)

FOREIGN PATENT DOCUMENTS

EP   3955470 A2   2/2022

OTHER PUBLICATIONS

Orangetm., et al., "Enhancement of O-RAN Split 7.2x", Dec. 2021, 14 Pages.

(Continued)

*Primary Examiner* — Hassan A Phillips
*Assistant Examiner* — Gautam Sharma
(74) *Attorney, Agent, or Firm* — Harrity & Harrity, LLP

(57) ABSTRACT

Various aspects of the present disclosure generally relate to wireless communication. In some aspects, a radio unit (RU) may receive, from a user equipment (UE), a demodulation reference signal (DMRS) associated with a channel. The RU may perform a channel estimation associated with the channel using the DMRS to obtain channel estimation information. The RU may transmit, to a distributed unit (DU), information that is based at least in part on the channel estimation information. Numerous other aspects are described.

27 Claims, 13 Drawing Sheets

(51) Int. Cl.
  *H04L 5/00* (2006.01)
  *H04L 41/0803* (2022.01)
  *H04W 72/21* (2023.01)

(56) References Cited

U.S. PATENT DOCUMENTS

| | | | | |
|---|---|---|---|---|
| 2012/0176966 | A1* | 7/2012 | Ling | H04W 88/085 |
| | | | | 370/328 |
| 2012/0207206 | A1* | 8/2012 | Samardzija | H03M 7/30 |
| | | | | 375/240 |
| 2013/0083768 | A1* | 4/2013 | Liu | H04L 27/2636 |
| | | | | 370/330 |
| 2016/0081046 | A1* | 3/2016 | Li | H04W 52/367 |
| | | | | 370/328 |
| 2017/0289845 | A1* | 10/2017 | Chiu | H04W 28/065 |
| 2017/0325229 | A1* | 11/2017 | Gao | H04W 72/52 |
| 2018/0287673 | A1* | 10/2018 | Chang | H04L 25/0224 |
| 2019/0036574 | A1* | 1/2019 | Zhu | H04B 7/0417 |
| 2019/0246394 | A1* | 8/2019 | Asplund | H04L 25/0202 |
| 2021/0007039 | A1* | 1/2021 | Salahuddeen | H04L 69/164 |
| 2022/0131580 | A1* | 4/2022 | Kuchi | H04B 7/0452 |
| 2022/0225290 | A1* | 7/2022 | Ganesan | H04W 84/005 |
| 2025/0038816 | A1* | 1/2025 | Beluri | H03M 7/70 |

OTHER PUBLICATIONS

Chang W., et al., "A Prefiltering C-RAN Architecture with Compressed Link Data Rate in Massive MIMO", 2016 IEEE 83rd Vehicular Technology Conference (VTC Spring), IEEE, May 15, 2016, pp. 1-5, XP032920014, Second column: Specifically [to] to BBU for demodulation, Third column: DMRS is always along [to] data rate overload, In this section [to] RRUs and BBUs Fifth column: Note that the key [to] has better performance, As shown in Fig. 2 [to] Matrix compression.

International Search Report and Written Opinion—PCT/US2023/060561—ISA/EPO—Apr. 20, 2023.

\* cited by examiner

ENHANCED FRONTHAUL INTERFACE SPLIT USING DEMODULATION REFERENCE SIGNAL CHANNEL ESTIMATES

CROSS-REFERENCE TO RELATED APPLICATION

This patent application claims priority to U.S. Provisional Patent Application No. 63/268,648, filed on Feb. 28, 2022, entitled "ENHANCED FRONTHAUL INTERFACE SPLIT USING DEMODULATION REFERENCE SIGNAL CHANNEL ESTIMATES," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses associated with an enhanced fronthaul interface split using demodulation reference signal (DMRS) channel estimates.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a radio unit (RU) for wireless communication. The radio unit may include a memory and one or more processors coupled to the memory. The one or more processors may be configured to receive, from a user equipment (UE), a demodulation reference signal (DMRS) associated with a channel. The one or more processors may be configured to perform a channel estimation associated with the channel using the DMRS to obtain channel estimation information. The one or more processors may be configured to transmit, to a distributed unit (DU), information that is based at least in part on the channel estimation information.

Some aspects described herein relate to a DU for wireless communication. The distributed unit may include a memory and one or more processors coupled to the memory. The one or more processors may be configured to receive, from an RU, information that is based at least in part on a DMRS channel estimation associated with a channel. The one or more processors may be configured to perform an action based at least in part on the information that is based at least in part on the DMRS channel estimation.

Some aspects described herein relate to a method of wireless communication performed by an RU. The method may include receiving, from a UE, a DMRS associated with a channel. The method may include performing a channel estimation associated with the channel using the DMRS to obtain channel estimation information. The method may include transmitting, to a DU, information that is based at least in part on the channel estimation information.

Some aspects described herein relate to a method of wireless communication performed by a DU. The method may include receiving, from an RU, information that is based at least in part on a DMRS channel estimation associated with a channel. The method may include performing an action based at least in part on the information that is based at least in part on the DMRS channel estimation.

Some aspects described herein relate to a non-transitory computer-readable medium that stores a set of instructions for wireless communication by an RU. The set of instructions, when executed by one or more processors of the RU, may cause the RU to receive, from a UE, a DMRS associated with a channel. The set of instructions, when executed by one or more processors of the RU, may cause the RU to perform a channel estimation associated with the channel using the DMRS to obtain channel estimation information. The set of instructions, when executed by one or more processors of the RU, may cause the RU to transmit, to a DU, information that is based at least in part on the channel estimation information.

Some aspects described herein relate to a non-transitory computer-readable medium that stores a set of instructions for wireless communication by a DU. The set of instructions, when executed by one or more processors of the DU, may cause the DU to receive, from an RU, information that is based at least in part on a DMRS channel estimation associated with a channel. The set of instructions, when executed by one or more processors of the DU, may cause the DU to perform an action based at least in part on the information that is based at least in part on the DMRS channel estimation.

Some aspects described herein relate to an apparatus for wireless communication. The apparatus may include means for receiving, from a UE, a DMRS associated with a channel. The apparatus may include means for performing a channel estimation associated with the channel using the DMRS to obtain channel estimation information. The apparatus may include means for transmitting, to a DU, information that is based at least in part on the channel estimation information.

Some aspects described herein relate to an apparatus for wireless communication. The apparatus may include means for receiving, from an RU, information that is based at least in part on a DMRS channel estimation associated with a channel. The apparatus may include means for performing an action based at least in part on the information that is based at least in part on the DMRS channel estimation.

Aspects generally include a method, apparatus, system, computer program product, non-transitory computer-readable medium, user equipment, base station, network entity, RU, DU, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

Figure 1:
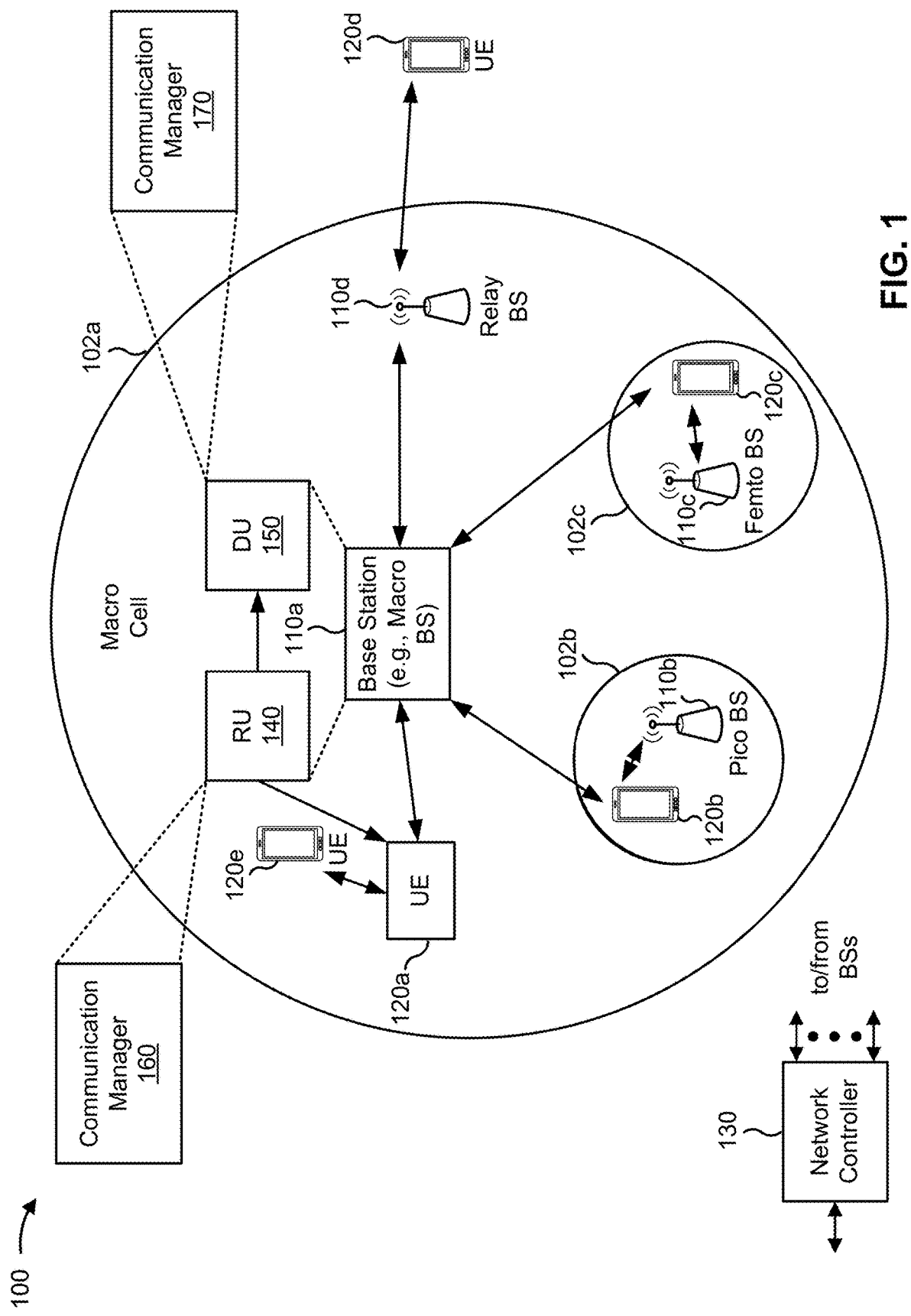
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some aspects, the terms "base station" (e.g., the base station 110) or "network node" or "network entity" may refer to an aggregated base station, a disaggregated base station (e.g., described in connection with FIG. 3), an integrated access and backhaul (IAB) node, a relay node, and/or one or more components thereof. For example, in some aspects, "base station," "network node," or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the terms "base station," "network node," or "network entity" may refer to one device configured to perform one or more functions, such as those described herein in connection with the base station 110. In some aspects, the terms "base station," "network node," or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the terms "base station," "network node," or "network entity" may refer to any one or more of those different devices. In some aspects, the terms "base station," "network node," or "network entity" may refer to one or more virtual base stations and/or one or more virtual base station functions. For example, in some aspects, two or more base station functions may be instantiated on a single device. In some aspects, the terms "base station," "network node," or "network entity" may refer to one of the base station functions and not another. In this way, a single device may include more than one base station. For example, as shown in FIG. 1, the wireless network 100 may include an RU 140 and a DU 150. The RU 140 may communicate with one or more UEs (e.g., the UE 120a) via a Uu interface. The RU 140 and the DU 150 may communicate via a fronthaul interface.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the RU 140 may include a communication manager 160. As described in more detail elsewhere herein, the communication manager 160 may receive, from a UE, a demodulation reference signal (DMRS) associated with a channel; perform a channel estimation associated with the channel using the DMRS to obtain channel estimation information; and transmit, to a DU (e.g., the DU 150), information that is based at least in part on the channel estimation information. Additionally, or alternatively, the communication manager 160 may perform one or more other operations described herein.

In some aspects, the DU 150 may include a communication manager 170. As described in more detail elsewhere herein, the communication manager 170 may receive, from an RU, information that is based at least in part on a DMRS channel estimation associated with a channel; and perform an action based at least in part on the information that is based at least in part on the DMRS channel estimation.

Additionally, or alternatively, the communication manager 170 may perform one or more other operations described herein.

As indicated above, FIG. 1 is provided as an example. Other examples may differ from what is described with regard to FIG. 1.

Figure 2:
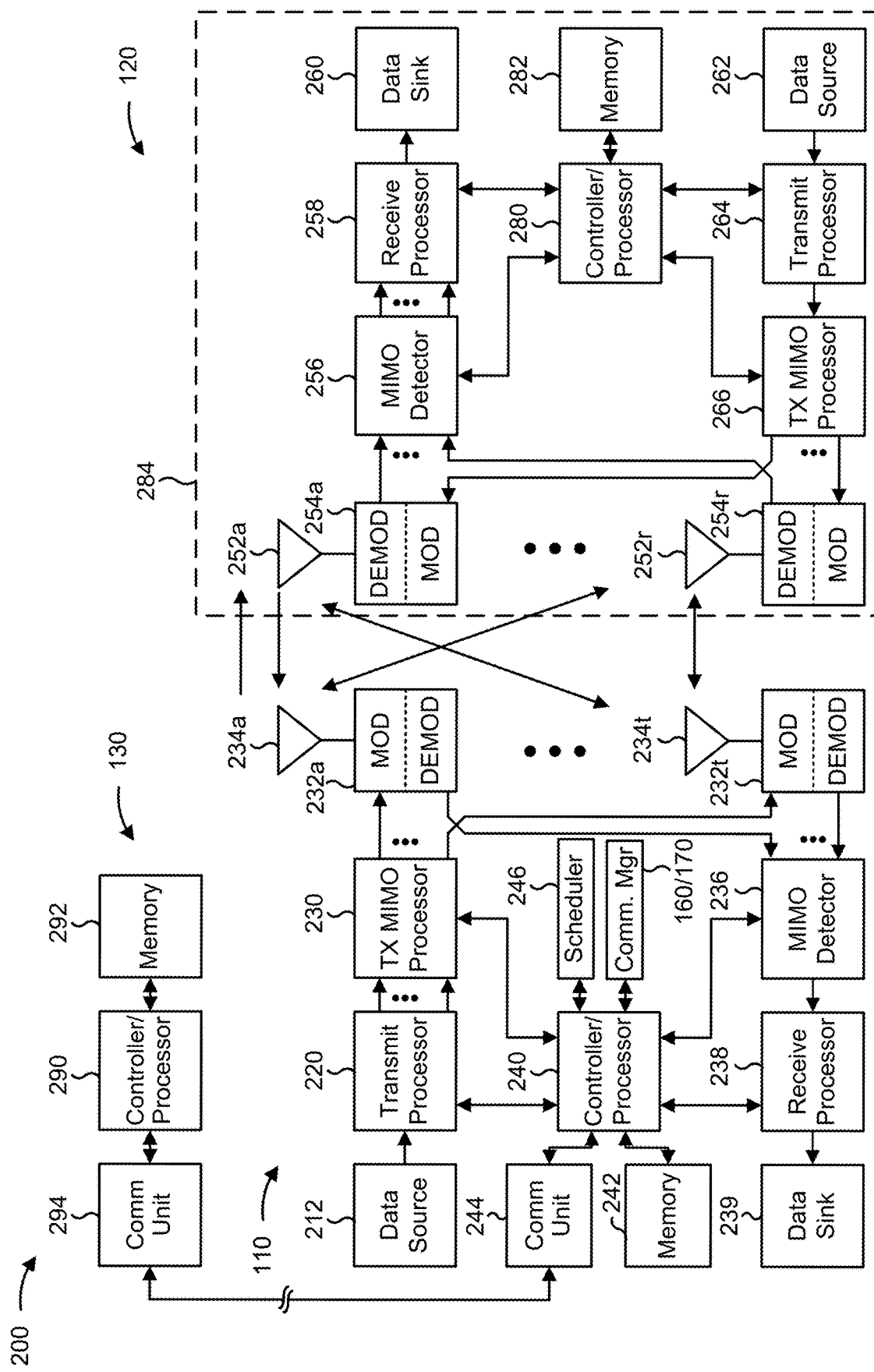
FIG. 2 is a diagram illustrating an example of a base station in communication with a user equipment in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 8-13).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 8-13).

The controller/processor 240 of the base station 110, the controller/processor 280 of the UE 120, and/or any other component(s) of FIG. 2 may perform one or more techniques associated with an enhanced fronthaul interface split using DMRS channel estimates, as described in more detail elsewhere herein. For example, the controller/processor 240 of the base station 110, the controller/processor 280 of the UE 120, and/or any other component(s) of FIG. 2 may perform or direct operations of, for example, process 1000 of FIG. 10, process 1100 of FIG. 11, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110, the RU 140, the DU 150, and/or the UE 120, may cause the one or more processors, the UE 120, and/or the base station 110 to perform or direct operations of, for example, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, the RU 140 includes means for receiving, from a UE, a DMRS associated with a channel; means for performing a channel estimation associated with the channel using the DMRS to obtain channel estimation information; and/or means for transmitting, to a DU, information that is based at least in part on the channel estimation information. In some aspects, the means for the RU 140 to perform operations described herein may include, for example, one or more of communication manager 160, transmit processor 220, TX MIMO processor 230, modem 232, antenna 234, MIMO detector 236, receive processor 238, controller/processor 240, memory 242, or scheduler 246.

In some aspects, the DU 150 includes means for receiving, from an RU, information that is based at least in part on a DMRS channel estimation associated with a channel; and/or means for performing an action based at least in part on the information that is based at least in part on the DMRS channel estimation. In some aspects, the means for the DU 150 to perform operations described herein may include, for example, one or more of communication manager 170, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G New Radio (NR) systems, may be arranged in multiple manners with various components or constituent parts. In a 5G NR system, or network, a network node, a network entity, a mobility element of a network, a radio access network (RAN) node, a core network node, a network element, a base station, or a network equipment may be implemented in an aggregated or disaggregated architecture. For example, a base station (such as a Node B (NB), evolved NB (eNB), NR base station (BS), 5G NB, gNodeB (gNB), access point (AP), transmit receive point (TRP), or cell), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station may be configured to utilize a radio protocol stack that is physically or logically integrated within a single RAN node (for example, within a single device or unit). A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also may be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that may be individually deployed. A disaggregated base station may include functionality implemented across two or more units at various physical locations, as well as functionality implemented for at least one unit virtually, which may enable flexibility in network design. The various units of the disaggregated base station may be configured for wired or wireless communication with at least one other unit of the disaggregated base station.

Figure 3:
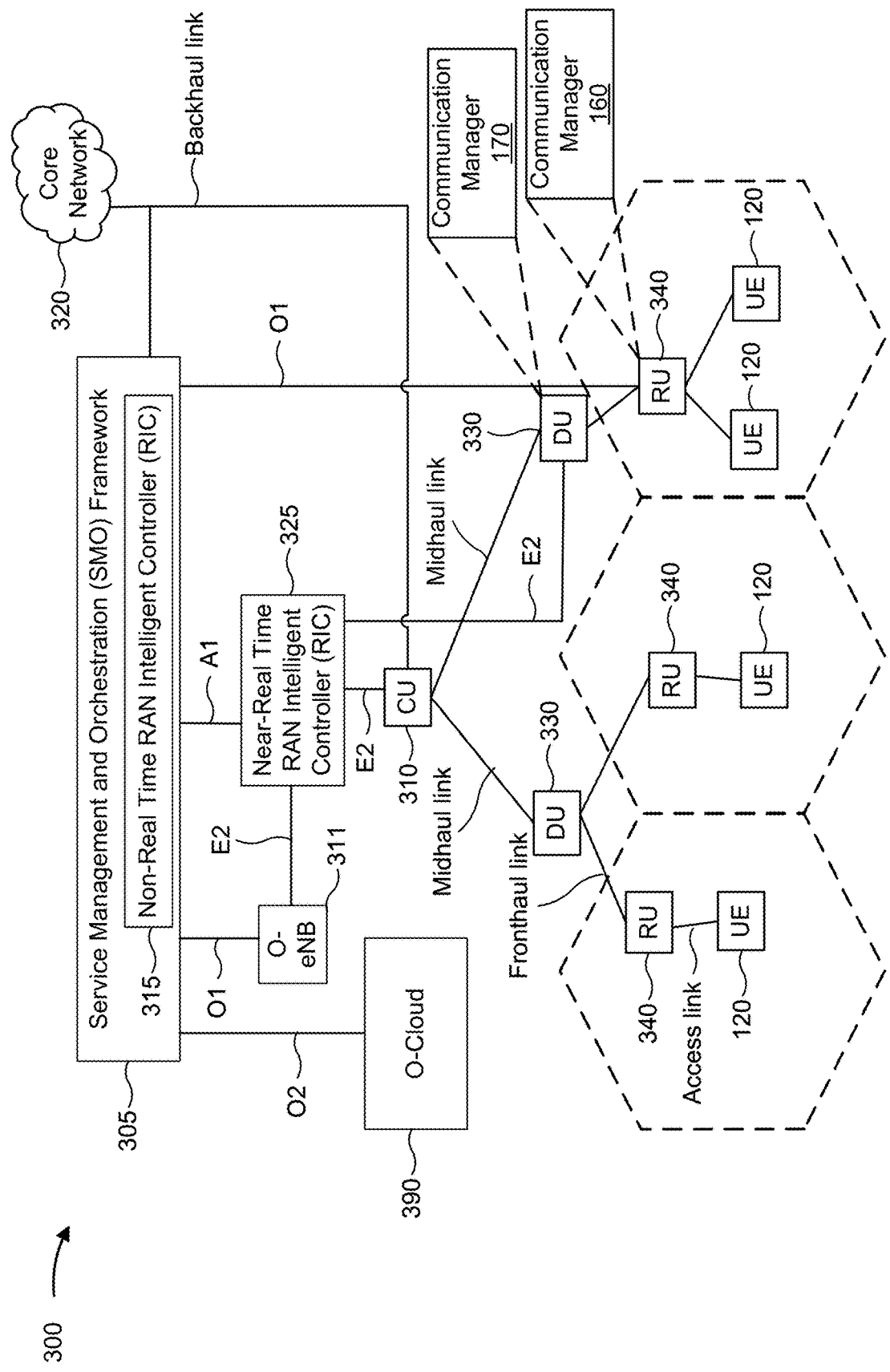
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces.

Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. As shown in FIG. 3, an RU 340 may include the communication manager 160 and a DU 330 may include the communication manager 170 (e.g., in a similar manner as described in connection with FIG. 1). In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which may also be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based at least in part on a functional split (for example, a functional split defined by the 3GPP, such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
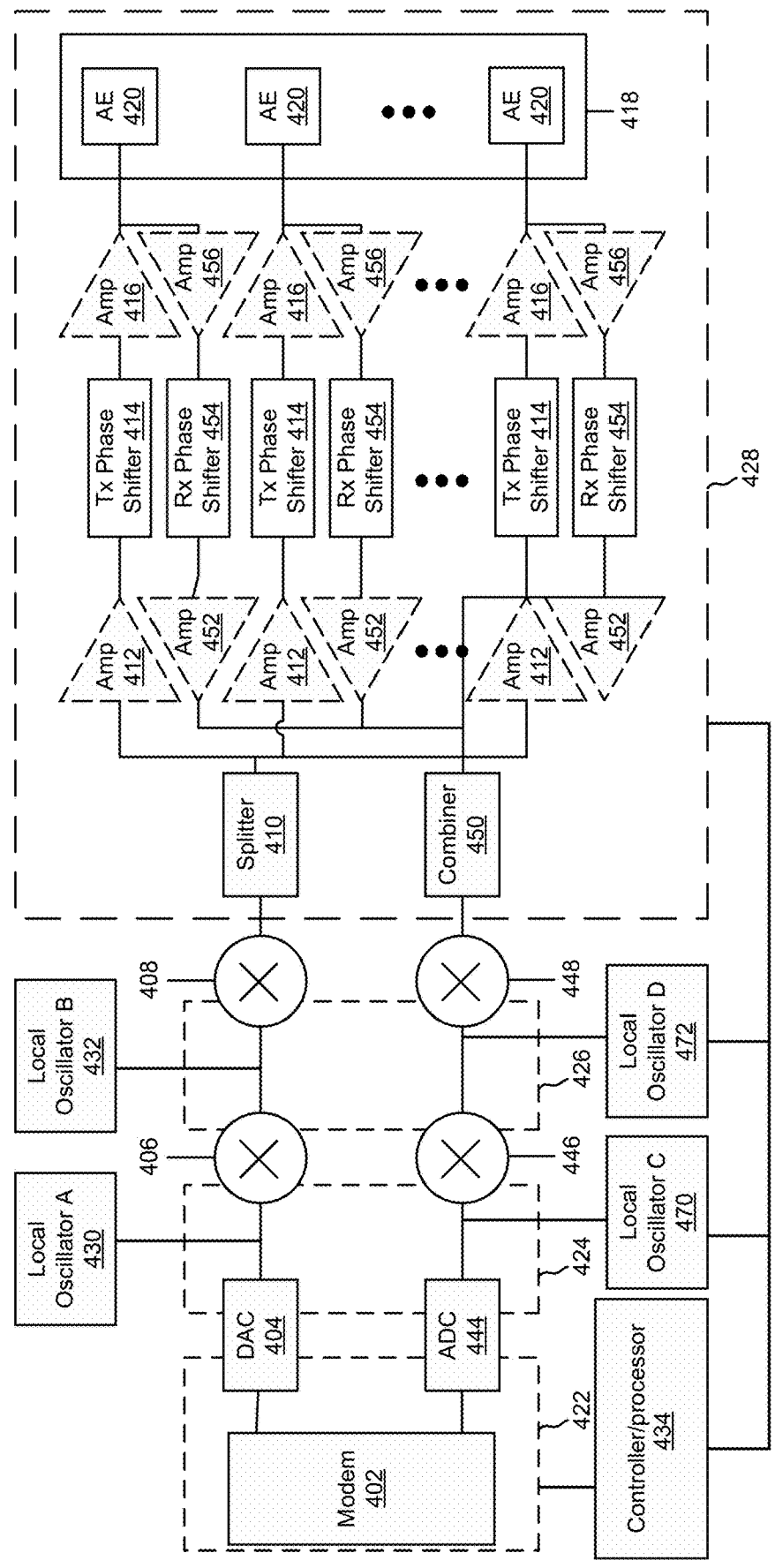
FIG. 4 is a diagram illustrating an example beamforming architecture that supports beamforming, in accordance with the present disclosure.

FIG. 4 is a diagram illustrating an example beamforming architecture 400 that supports beamforming, in accordance with the present disclosure. In some aspects, architecture 400 may implement aspects of wireless network 100 and/or the disaggregated base station architecture 300. In some aspects, architecture 400 may be implemented in a transmitting device (e.g., a first wireless communication device, UE, a network entity, a CU, a DU, an RU, or base station) and/or a receiving device (e.g., a second wireless communication device, UE, a network entity, a CU, a DU, an RU, or base station), as described herein.

Broadly, FIG. 4 is a diagram illustrating example hardware components of a wireless communication device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 400 includes a modem (modulator/demodulator) 402, a digital to analog converter (DAC) 404, a first mixer 406, a second mixer 408, and a splitter 410. The architecture 400 also includes multiple first amplifiers 412, multiple phase shifters 414, multiple second amplifiers 416, and an antenna array 418 that includes multiple antenna elements 420. In some examples, the modem 402 may be one or more of the modems 232 or modems 254 described in connection with FIG. 2.

Transmission lines or other waveguides, wires, and/or traces are shown connecting the various components to illustrate how signals to be transmitted may travel between components. Reference numbers 422, 424, 426, and 428 indicate regions in the architecture 400 in which different types of signals travel or are processed. Specifically, reference number 422 indicates a region in which digital baseband signals travel or are processed, reference number 424 indicates a region in which analog baseband signals travel or are processed, reference number 426 indicates a region in which analog intermediate frequency (IF) signals travel or are processed, and reference number 428 indicates a region in which analog radio frequency (RF) signals travel or are processed. The architecture also includes a local oscillator A 430, a local oscillator B 432, and a controller/processor 434. In some aspects, controller/processor 434 corresponds to controller/processor 240 of the base station described above in connection with FIG. 2, a controller/processor of a network entity (e.g., a base station, a CU, a DU, or an RU), and/or controller/processor 280 of the UE described above in connection with FIG. 2.

Each of the antenna elements 420 may include one or more sub-elements for radiating or receiving RF signals. For example, a single antenna element 420 may include a first sub-element cross-polarized with a second sub-element that can be used to independently transmit cross-polarized signals. The antenna elements 420 may include patch antennas, dipole antennas, or other types of antennas arranged in a linear pattern, a two dimensional pattern, or another pattern. A spacing between antenna elements 420 may be such that signals with a desired wavelength transmitted separately by the antenna elements 420 may interact or interfere (e.g., to form a desired beam). For example, given an expected range of wavelengths or frequencies, the spacing may provide a quarter wavelength, half wavelength, or other fraction of a wavelength of spacing between neighboring antenna elements 420 to allow for interaction or interference of signals transmitted by the separate antenna elements 420 within that expected range.

The modem 402 processes and generates digital baseband signals and may also control operation of the DAC 404, first and second mixers 406, 408, splitter 410, first amplifiers 412, phase shifters 414, and/or the second amplifiers 416 to transmit signals via one or more or all of the antenna elements 420. The modem 402 may process signals and control operation in accordance with a communication standard such as a wireless standard discussed herein. The DAC 404 may convert digital baseband signals received from the modem 402 (and that are to be transmitted) into analog baseband signals. The first mixer 406 upconverts analog baseband signals to analog IF signals within an IF using a local oscillator A 430. For example, the first mixer 406 may mix the signals with an oscillating signal generated by the local oscillator A 430 to "move" the baseband analog signals to the IF. In some cases, some processing or filtering (not shown) may take place at the IF. The second mixer 408 upconverts the analog IF signals to analog RF signals using the local oscillator B 432. Similar to the first mixer, the second mixer 408 may mix the signals with an oscillating signal generated by the local oscillator B 432 to "move" the IF analog signals to the RF or the frequency at which signals will be transmitted or received. The modem 402 and/or the controller/processor 434 may adjust the frequency of local oscillator A 430 and/or the local oscillator B 432 so that a desired IF and/or RF frequency is produced and used to facilitate processing and transmission of a signal within a desired bandwidth.

In the illustrated architecture 400, signals upconverted by the second mixer 408 are split or duplicated into multiple signals by the splitter 410. The splitter 410 in architecture 400 splits the RF signal into multiple identical or nearly identical RF signals. In other examples, the split may take place with any type of signal, including with baseband digital, baseband analog, or IF analog signals. Each of these signals may correspond to an antenna element 420, and the signal travels through and is processed by amplifiers 412, 416, phase shifters 414, and/or other elements corresponding to the respective antenna element 420 to be provided to and transmitted by the corresponding antenna element 420 of the antenna array 418. In one example, the splitter 410 may be an active splitter that is connected to a power supply and provides some gain so that RF signals exiting the splitter 410 are at a power level equal to or greater than the signal entering the splitter 410. In another example, the splitter 410 is a passive splitter that is not connected to power supply and the RF signals exiting the splitter 410 may be at a power level lower than the RF signal entering the splitter 410.

After being split by the splitter 410, the resulting RF signals may enter an amplifier, such as a first amplifier 412, or a phase shifter 414 corresponding to an antenna element 420. The first and second amplifiers 412, 416 are illustrated with dashed lines because one or both of them might not be necessary in some aspects. In some aspects, both the first amplifier 412 and second amplifier 416 are present. In some aspects, neither the first amplifier 412 nor the second amplifier 416 is present. In some aspects, one of the two amplifiers 412, 416 is present but not the other. By way of example, if the splitter 410 is an active splitter, the first amplifier 412 may not be used. By way of further example, if the phase shifter 414 is an active phase shifter that can provide a gain, the second amplifier 416 might not be used.

The amplifiers 412, 416 may provide a desired level of positive or negative gain. A positive gain (positive dB) may be used to increase an amplitude of a signal for radiation by a specific antenna element 420. A negative gain (negative dB) may be used to decrease an amplitude and/or suppress radiation of the signal by a specific antenna element. Each of the amplifiers 412, 416 may be controlled independently (e.g., by the modem 402 or the controller/processor 434) to provide independent control of the gain for each antenna element 420. For example, the modem 402 and/or the controller/processor 434 may have at least one control line connected to each of the splitter 410, first amplifiers 412, phase shifters 414, and/or second amplifiers 416 that may be used to configure a gain to provide a desired amount of gain for each component and thus each antenna element 420.

The phase shifter 414 may provide a configurable phase shift or phase offset to a corresponding RF signal to be transmitted. The phase shifter 414 may be a passive phase shifter not directly connected to a power supply. Passive phase shifters might introduce some insertion loss. The second amplifier 416 may boost the signal to compensate for the insertion loss. The phase shifter 414 may be an active phase shifter connected to a power supply such that the active phase shifter provides some amount of gain or prevents insertion loss. The settings of each of the phase shifters 414 are independent, meaning that each can be independently set to provide a desired amount of phase shift or the same amount of phase shift or some other configuration. The modem 402 and/or the controller/processor 434 may have at least one control line connected to each of the phase shifters 414 and which may be used to configure the phase shifters 414 to provide a desired amount of phase shift or phase offset between antenna elements 420.

In the illustrated architecture 400, RF signals received by the antenna elements 420 are provided to one or more first amplifiers 456 to boost the signal strength. The first amplifiers 456 may be connected to the same antenna arrays 418 (e.g., for time division duplex (TDD) operations). The first amplifiers 456 may be connected to different antenna arrays 418. The boosted RF signal is input into one or more phase shifters 454 to provide a configurable phase shift or phase offset for the corresponding received RF signal to enable reception via one or more Rx beams. The phase shifter 454 may be an active phase shifter or a passive phase shifter. The settings of the phase shifters 454 are independent, meaning that each can be independently set to provide a desired amount of phase shift or the same amount of phase shift or some other configuration. The modem 402 and/or the controller/processor 434 may have at least one control line connected to each of the phase shifters 454 and which may be used to configure the phase shifters 454 to provide a desired amount of phase shift or phase offset between antenna elements 420 to enable reception via one or more Rx beams.

The outputs of the phase shifters 454 may be input to one or more second amplifiers 452 for signal amplification of the phase shifted received RF signals. The second amplifiers 452 may be individually configured to provide a configured amount of gain. The second amplifiers 452 may be individually configured to provide an amount of gain to ensure that the signals input to combiner 450 have the same magnitude. The amplifiers 452 and/or 456 are illustrated in dashed lines because they might not be necessary in some aspects. In some aspects, both the amplifier 452 and the amplifier 456 are present. In another aspect, neither the amplifier 452 nor the amplifier 456 are present. In other aspects, one of the amplifiers 452, 456 is present but not the other.

In the illustrated architecture 400, signals output by the phase shifters 454 (via the amplifiers 452 when present) are combined in combiner 450. The combiner 450 in architecture 400 combines the RF signal into a signal. The combiner 450 may be a passive combiner (e.g., not connected to a power source), which may result in some insertion loss. The combiner 450 may be an active combiner (e.g., connected to a power source), which may result in some signal gain. When combiner 450 is an active combiner, it may provide a different (e.g., configurable) amount of gain for each input signal so that the input signals have the same magnitude when they are combined. When combiner 450 is an active combiner, the combiner 450 may not need the second amplifier 452 because the active combiner may provide the signal amplification.

The output of the combiner 450 is input into mixers 448 and 446. Mixers 448 and 446 generally down convert the received RF signal using inputs from local oscillators 472 and 470, respectively, to create intermediate or baseband signals that carry the encoded and modulated information. The output of the mixers 448 and 446 are input into an analog-to-digital converter (ADC) 444 for conversion to digital signals. The digital signals output from ADC 444 are input to modem 402 for baseband processing, such as decoding, de-interleaving, or similar operations.

The architecture 400 is given by way of example only to illustrate an architecture for transmitting and/or receiving signals. In some cases, the architecture 400 and/or each portion of the architecture 400 may be repeated multiple times within an architecture to accommodate or provide an arbitrary number of RF chains, antenna elements, and/or antenna panels. Furthermore, numerous alternate architectures are possible and contemplated. For example, although only a single antenna array 418 is shown, two, three, or more antenna arrays may be included, each with one or more of their own corresponding amplifiers, phase shifters, splitters, mixers, DACs, ADCs, and/or modems. For example, a single UE may include two, four, or more antenna arrays for transmitting or receiving signals at different physical locations on the UE or in different directions.

Furthermore, mixers, splitters, amplifiers, phase shifters and other components may be located in different signal type areas (e.g., represented by different ones of the reference numbers 422, 424, 426, 428) in different implemented architectures. For example, a split of the signal to be transmitted into multiple signals may take place at the analog RF, analog IF, analog baseband, or digital baseband frequencies in different examples. Similarly, amplification and/or phase shifts may also take place at different frequencies. For example, in some aspects, one or more of the splitter 410, amplifiers 412, 416, or phase shifters 414 may be located between the DAC 404 and the first mixer 406 or between the first mixer 406 and the second mixer 408. In one example, the functions of one or more of the components may be combined into one component. For example, the phase shifters 414 may perform amplification to include or replace the first and/or or second amplifiers 412, 416. By way of another example, a phase shift may be implemented by the second mixer 408 to obviate the need for a separate phase shifter 414. This technique is sometimes called local oscillator (LO) phase shifting. In some aspects of this configuration, there may be multiple IF to RF mixers (e.g., for each antenna element chain) within the second mixer 408, and the local oscillator B 432 may supply different local oscillator signals (with different phase offsets) to each IF to RF mixer.

The modem 402 and/or the controller/processor 434 may control one or more of the other components 404 through 472 to select one or more antenna elements 420 and/or to form beams for transmission of one or more signals. For example, the antenna elements 420 may be individually selected or deselected for transmission of a signal (or signals) by controlling an amplitude of one or more corresponding amplifiers, such as the first amplifiers 412 and/or the second amplifiers 416. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element 420, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 418) can be dynamically controlled by modifying the phase shifts or phase offsets imparted by the phase shifters 414 and amplitudes imparted by the amplifiers 412, 416 of the multiple signals relative to each other (e.g., in accordance with one or more beamforming weights). The controller/processor 434 may be located partially or fully within one or more other components of the architecture 400. For example, the controller/processor 434 may be located within the modem 402 in some aspects.

For example, as described above, beamforming is a technique used to form directional, unicast beams between a UE and a network entity (e.g., a base station or an RU, among other examples) so that performance of a radio link between the UE and the network entity is improved. To perform beamforming, a network entity may form a transmit beam directed to the UE, and the UE may form a receive beam to receive the transmit beam. Additionally, or alternatively, the UE may form a transmit beam directed to the network entity, and the network entity may form a receive beam to receive the transmit beam. The network entity and/or the UE may use various hardware components to accomplish beamforming, such as controllers/processors, amplifiers, phase shifters, and/or antenna elements, among other examples, as described in more detail above. In some aspects, beamforming may use a beamforming codebook that includes one or more sets of beamforming weights (e.g., phase shifting coefficients, and/or amplitude coefficients, among other examples) which may be applied to an antenna array for a given frequency range.

As indicated above, FIG. 4 is provided as an example. Other examples may differ from what is described with regard to FIG. 4.

Figure 5:
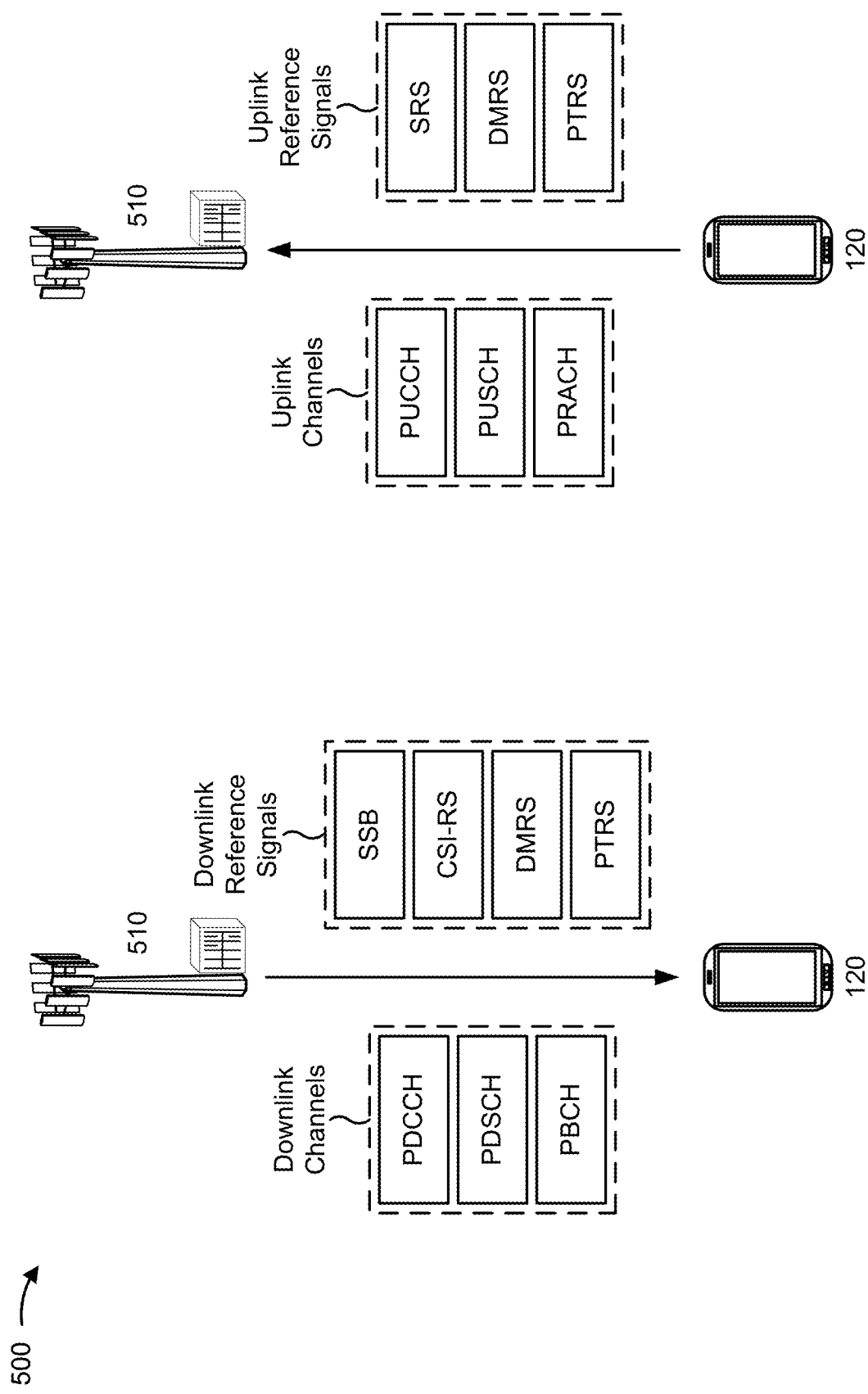
FIG. 5 is a diagram illustrating an example of physical channels and reference signals in a wireless network, in accordance with the present disclosure.

FIG. 5 is a diagram illustrating an example 500 of physical channels and reference signals in a wireless network, in accordance with the present disclosure. As shown in FIG. 5, downlink channels and downlink reference signals may carry information from a network entity 510 to a UE 120, and uplink channels and uplink reference signals may carry information from a UE 120 to a network entity 510. The network entity 510 may include a base station 110, a CU, a DU, and/or an RU, among other examples.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a demodulation reference signal (DMRS), a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some aspects, the network entity 510 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The network entity 510 may configure a set of CSI-RSs for the UE 120, and the UE 120 may measure the configured set of CSI-RSs. Based at least in part on the measurements, the UE 120 may perform channel estimation and may report channel estimation parameters to the network entity 510 (e.g., in a CSI report), such as a channel quality indicator (CQI), a precoding matrix indicator (PMI), a CSI-RS resource indicator (CRI), a layer indicator (LI), a rank indicator (RI), or a reference signal received power (RSRP), among other examples. The network entity 510 may use the CSI report to select transmission parameters for downlink communications to the UE 120, such as a number of transmission layers (e.g., a rank), a precoding matrix (e.g., a precoder), a modulation and coding scheme (MCS), or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE).

As shown, PTRSs are used for both downlink communications (e.g., on the PDSCH) and uplink communications (e.g., on the PUSCH).

A PRS may carry information used to enable timing or ranging measurements of the UE 120 based on signals transmitted by the network entity 510 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the network entity 510 may then calculate a position of the UE 120 based on the RSTD measurements reported by the UE 120.

An SRS may carry information used for uplink channel estimation, which may be used for scheduling, link adaptation, precoder selection, or beam management, among other examples. The network entity 510 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The network entity 510 may measure the SRSs, may perform channel estimation based at least in part on the measurements, and may use the SRS measurements to configure communications with the UE 120.

As indicated above, FIG. 5 is provided as an example. Other examples may differ from what is described with regard to FIG. 5.

Figure 6:
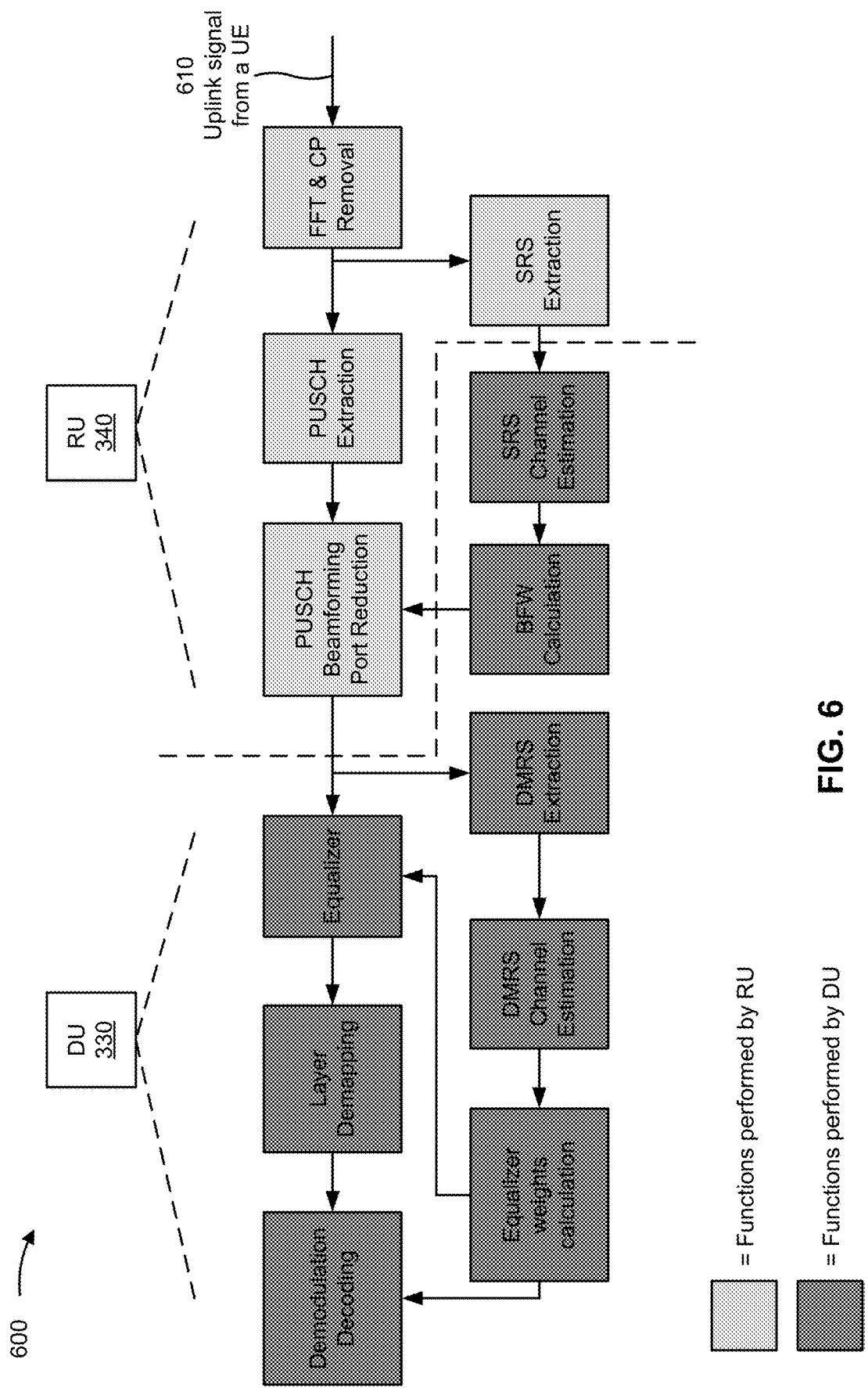
FIG. 6 is a diagram illustrating an example of a fronthaul interface functional split for uplink communications, in accordance with the present disclosure.

FIG. 6 is a diagram illustrating an example 600 of a fronthaul interface functional split for uplink communications, in accordance with the present disclosure. The fronthaul interface functional split may define operations performed by an RU (e.g., the RU 340) and a DU (e.g., the DU 330) for uplink communications. In some aspects, the fronthaul interface functional split may be defined, or otherwise fixed, by a wireless communication standard, such as the 3GPP or the O-RAN Alliance, among other examples. The blocks depicted in FIG. 6 represent operations and/or modules that may be implemented via or more hardware components of the RU 340 or the DU 330. The functional split is depicted in FIG. 6 by the dashed lines. For example, an arrow crossing a dashed line, as depicted in FIG. 6, may be associated with a transmission over a fronthaul interface (e.g., between the RU and the DU). Additionally, arrows that do not cross the dashed lines may refer to internal operations of a given device (e.g., the RU or the DU).

As shown by reference number 610, the RU 340 may receive, from a UE, an uplink signal. The RU 340 may perform FFT and/or cyclic prefix (CP) removal associated with the uplink signal. After performing FFT and/or CP removal, the RU 340 may extract an SRS from the uplink signal. Additionally, the RU 340 may perform PUSCH extraction associated with the uplink signal. As shown in FIG. 6, the RU 340 may transmit, and the DU 330 may receive, the extracted SRS from the uplink signal. The DU 330 may perform channel estimation using the SRS. The DU 330 may calculate one or more beamforming weights using the SRS-based channel estimation. The DU 330 may transmit, and the RU 340 may receive, an indication of the one or more beamforming weights to enable the RU 340 to perform beamforming associated with the uplink signal (e.g., after performing the PUSCH extraction). For example, the uplink signal as received may be associated with R data streams or layers. The RU 340 may perform beamforming (e.g., port reduction) to reduce the R data steams to L data streams (e.g., where L is less than R). For example, the RU 340 may perform beamforming to focus the received uplink signal to one or more ports (e.g., antenna ports) via which data associated with the uplink signal is expected to be received. The RU 340 may transmit, and the DU 330 may receive, the L data streams associated with the uplink signal (e.g., after the beamforming or port reduction applied by the RU 340).

The L data streams may be used for DMRS extraction performed by the DU 330 (e.g., to extract a DMRS from the uplink signal). Additionally, the L data streams may be provided as an input to an equalizer of the DU 330 (e.g., to equalize the uplink channel). As shown in FIG. 6, the DU 330 may perform channel estimation using the DMRS (e.g., that is extracted from the L data streams or the beamformed uplink signal). The DU 330 may determine or calculate one or more equalizer weights using the DMRS-based channel estimation. The DU 330 may provide the one or more equalizer weights as an input to the equalizer and/or for a demodulation/decoding operation. As shown in FIG. 6, the DU 330 may perform layer demapping associated with the uplink signal after performing equalization. The DU 330 may demodulate and/or decode the uplink signal (e.g., after performing layer demapping).

As shown in FIG. 6 and described above, beamforming weights for uplink communications may be derived using SRS-based channel estimations (e.g., performed by the DU 330). DMRS-based channel estimations (e.g., performed by the DU 330) may be used for demodulation of uplink signals.

As indicated above, FIG. 6 is provided as an example. Other examples may differ from what is described with regard to FIG. 6.

Figure 7:
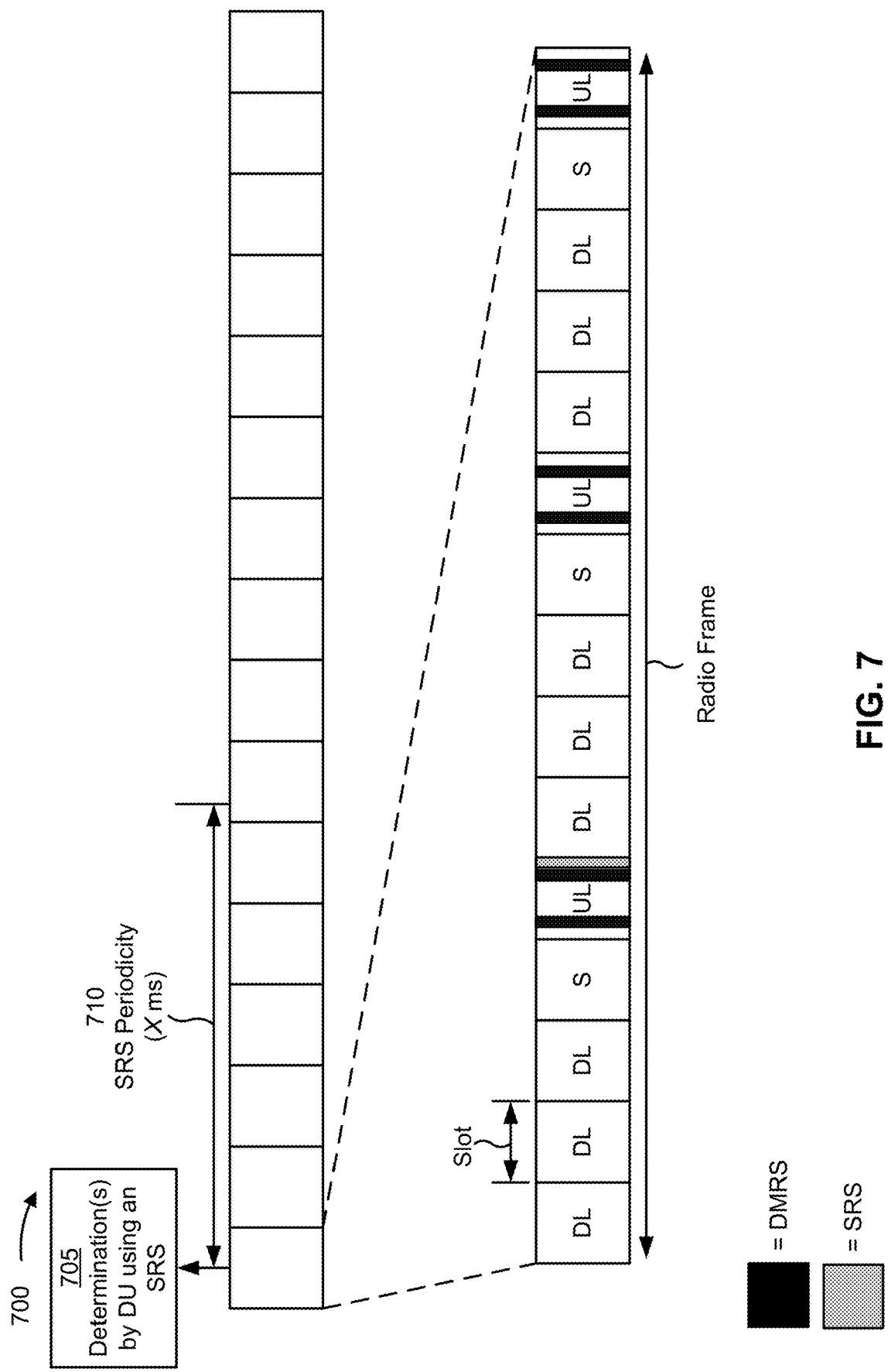
FIG. 7 is a diagram illustrating an example of sounding reference signal based determinations by a network entity, in accordance with the present disclosure.

FIG. 7 is a diagram illustrating an example 700 of SRS-based determinations by a network entity, in accordance with the present disclosure. In some aspects, the network entity may be a DU. In some other aspects, the network entity may be a base station, an RU, and/or a CU, among other examples.

FIG. 7 depicts an example frame structure in a wireless communication network, such as the wireless network 100. The frame structure shown in FIG. 7 is for time division duplexing (TDD) in a telecommunication system, such as LTE or NR. Although the example is depicted in connection with TDD, the examples described herein may be similarly applied to frequency division duplexing (FDD), spatial division duplexing (SDM), and/or other duplexing schemes. The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., 2m slots per subframe are shown in FIG. 7, where m is an index of a numerology used for a transmission, such as 0, 1, 2, 3, 4, or another number). Each slot may include a set of L symbol periods. For example, each slot may include fourteen symbol periods, seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit may be frame-based, subframe-based, slot-based, mini-slot based, or symbol-based. A slot may be configured with a link direction for transmission, such as downlink (DL) or uplink (UL). In some aspects, the link direction for a slot may be dynamically configured. A slot may also be configured as a special slot (S) that may include a guard time for switching directions (e.g., a special slot may include one or more downlink symbols, one or more guard symbols, and one or more uplink symbols).

As shown in FIG. 7, an uplink slot may include a transmission of one or more DMRSs (e.g., two DMRSs as shown in FIG. 7). For example, in some cases, a UE may be configured (e.g., by a network entity) to transmit one or more DMRSs in each uplink slot. Additionally, as shown in FIG. 7, the uplink slot may include a transmission, by the UE, of an SRS. The UE may not transmit an SRS in each uplink slot. Rather, the UE may transmit an SRS in accordance with a configuration or periodic schedule associated with the SRS.

As shown by reference number 705, a network entity (e.g., a DU and/or an RU) may make one or more determinations using a measurement of the SRS. For example, as described above, the network entity may perform a channel estimation by measuring the SRS. The network entity may use the SRS-based channel estimation to perform beamforming for the channel and/or to calculate one or more beamforming weights. Additionally, or alternatively, the network entity may determine whether to pair two or more UEs together for improved scheduling decisions in uplink massive MIMO (mMIMO) scenarios. For example, in some cases, a DU may pair two or more UEs together to be co-scheduled for uplink transmissions. For example, where two or more UEs are associated with spatial directions that are sufficiently separated (e.g., are associated with beams that are associated with different spatial directions), the DU may pair the two or more UEs together such that the two or more UEs can be scheduled to transmit uplink transmissions at the same time or at least partially overlapping times (e.g., such that the uplink communications are multiplexed by an RU and/or a DU). Because the two or more UEs are associated with different spatial directions, the simultaneous uplink transmissions may not cause interference when received by an RU at approximately the same time. Pairing may enable improved efficiency in scheduling and/or network resource usage by enabling two or more UEs to be scheduled to transmit uplink resources using overlapping time domain resources and/or overlapping frequency domain resources.

As shown by reference number 710, an SRS may be associated with a periodicity (e.g., of X ms). The value of X may be configured in an RRC configuration associated with the SRS. In some cases, the value of X may be 2 ms, 5 ms, 10 ms, 20 ms, 40 ms, 80 ms, 160 ms, or 320 ms, among other examples. Based at least in part on a numerology associated with the wireless communication system (e.g., a subcarrier spacing (SCS) or other parameters), this may result in an SRS being transmitted once every few slots or once every few radio frames. As described above (e.g., in connection with FIG. 6), a DU may only have access to raw channel estimations that are based on received SRSs. As used herein, "raw channel estimation" or "raw channel estimate" may refer to a channel estimation that is performed prior to the receiver performing beamforming or port reduction associated with the signal. For example, a raw channel estimation may be a full dimensional channel estimation (e.g., a channel estimation that uses a full array or a full dimension of a signal). "Raw channel estimation" and "full dimensional channel estimation" may be used interchangeably herein. Raw channel estimations may provide improved spatial information associated with a transmitter of the signal. For example, as shown in FIG. 6, a DU may be enabled to perform DMRS-based channel estimation. However, the DMRS is extracted from the beamformed uplink signal. Therefore, the DMRS-based channel estimation may not provide sufficient spatial information associated with a UE to enable the DU to make one or more determinations, such as those described above in connection with reference number 705.

Because of the periodicity associated with the SRS, a network entity (e.g., a DU and/or an RU) may make a determination based at least in part on a received SRS at a first time (e.g., as shown by reference number 705). However, a next SRS may not be received for X ms. During that time, the UE may move (e.g., the UE may be mobile and may be moving, such that spatial information associated with the UE changes during the X ms). Additionally, link conditions between the UE and the network entity (e.g., a Uu link between the UE and an RU) may change during the X ms. This may result in outdated determinations made based at least in part on the SRS. For example, a DU may pair a UE with another UE based at least in part on measuring the SRS transmitted by the UE. However, before the UE transmits a next SRS, the UE may move such that a new spatial direction associated with the UE causes uplink signals transmitted by the UE to interfere with uplink signals transmitted by the other UE (e.g., that is paired with the UE). Additionally, because the spatial information associated with the UE may change over the X ms, beamforming information (e.g., one or more beamforming weights) that is based at least in part on the SRS may be outdated and/or incorrect. Reducing a value of X (e.g., such that SRSs are transmitted more frequently by the UE) may increase signaling overhead associated with the UE, thereby reducing a data throughput associated with the UE.

In some cases, a DMRS-based raw channel estimation may be used (e.g., by an RU) to perform beamforming (e.g., as depicted and described in more detail in connection with FIG. 9) for the PUSCH. In such examples, uplink pairing determinations (e.g., for uplink mMIMO pairing) made by a DU based at least in part on SRS-based channel estimations may not be coherent with uplink beamforming weights that are based at least in part on DMRS-based channel estimations. Additionally, in some cases, beamforming weights for the PUCCH may be based at least in part on downlink beamforming weights (e.g., because channel estimations for the PUCCH may be unavailable). This may degrade PUCCH detection and/or decoding by a network entity (e.g., an RU or a DU).

Some techniques and apparatuses described herein enable an enhanced fronthaul interface split using DMRS channel estimates. For example, an RU may receive, from a UE, a DMRS. The RU may perform a channel estimation, associated with a channel, using the DMRS (e.g., a raw channel estimation without performing beamforming or port reduction associated with the signal). The RU may transmit, and a DU may receive, information that is based at least in part on the channel estimation information (e.g., the DMRS-based raw channel estimation). The DU may perform one or more actions based at least in part on the information (e.g., scheduling determinations, UE pairing determinations, and/or PUCCH beamforming determinations, among other examples).

As a result, uplink channel management may be improved by enabling DMRS-based channel estimations that use a full antenna array of an RU (e.g., without performing beamforming or port reduction) to be provided to a DU. The DMRS-based channel estimations may improve determinations or actions made by the DU because the DMRS-based channel estimations may be based on more recent channel conditions (e.g., because DMRSs may be transmitted more frequently by UEs than other reference signals, such as SRSs). Additionally, this may reduce a signaling overhead associated with other reference signals, such as an SRS, because the network may not need the other reference signals to be transmitted by UEs as frequently (e.g., because the determinations are made based at least in part on DMRSs transmitted by the UEs). As a result of reducing the signaling overhead (e.g., an SRS signaling overhead), data throughput over the uplink channel may be improved. Additionally, uplink channel detection and/or decoding may be improved because the DMRS-based channel estimations may enable improved beamforming determinations or calculations for an uplink channel (e.g., the PUSCH and/or the PUCCH).

As indicated above, FIG. 7 is provided as an example. Other examples may differ from what is described with regard to FIG. 7.

Figure 8:
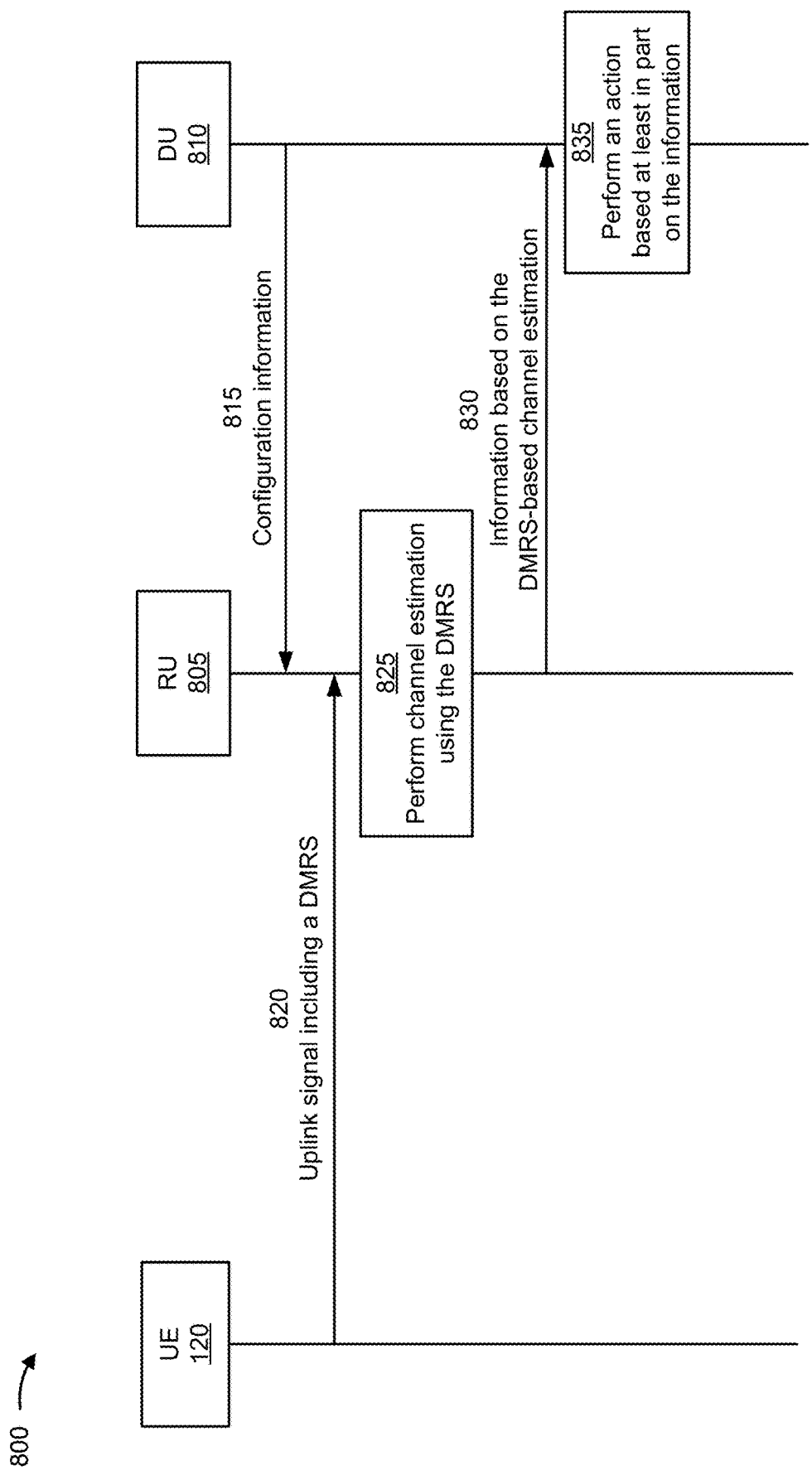
FIG. 8 is a diagram of an example associated with an enhanced fronthaul interface split using demodulation reference signal channel estimates, in accordance with the present disclosure.

FIG. 8 is a diagram of an example 800 associated with an enhanced fronthaul interface split using DMRS channel estimates, in accordance with the present disclosure. As shown in FIG. 8, multiple network nodes may communicate with a UE (e.g., UE 120). The multiple network nodes may include one or more base stations 110, one or more CUs, one or more DUs, one or more RUs, one or more core network nodes, one or more network servers, one or more application servers, and/or one or more access and mobility management functions (AMFs), among other examples. For example, as shown in FIG. 8, the multiple network nodes may include an RU 805 and a DU 810. In some aspects, the UE 120 and the multiple network nodes may be part of a wireless network (e.g., the wireless network 100). The UE 120 and the RU 805 may have established a wireless connection prior to operations shown in FIG. 8. In some aspects, the UE 120 and the RU 805 may communicate using beamformed signals (e.g., in a similar manner as described in more detail elsewhere herein). In some aspects, the RU 805 may communicate with multiple UEs 120 in a similar manner as described herein. Additionally, in some examples, the DU 810 may communicate with multiple RUs 805 in a similar manner as described herein.

As shown by reference number 815, the DU 810 may transmit, and the RU 805 may receive, configuration information. In some aspects, the DU 810 may transmit the configuration information via a fronthaul interface between the DU 810 and the RU 805 (e.g., in a similar manner as described in connection with FIG. 3). In some aspects, the DU 810 may transmit, and the RU 805 may receive, the configuration information via a control plane or a management plane of the fronthaul interface. In some aspects, the configuration information may indicate one or more actions or operations to be performed by the RU 805. For example, the configuration information may be associated with DMRS channel estimation performed by the RU 805. In some aspects, the configuration information may indicate a manner in which the RU 805 is to provide DMRS-based channel estimation information to the DU 810.

For example, the configuration information may include a compression configuration. The compression configuration may indicate how the RU 805 is to compress one or more DMRS-based channel estimates to be transmitted to the DU 810. For example, the compression configuration may indicate that DMRS-based channel estimation information is to be compressed in the time domain, in the frequency domain, in the spatial domain, and/or in the resolution domain (e.g., compressing the information to a lower resolution), among other examples. Additionally, or alternatively, the configuration information may include a downsampling configuration. For example, the configuration information may indicate that the RU 805 is to perform downsampling (e.g., to reduce a sampling rate) associated with the DMRS-based channel estimation information to be provided to the DU 810. The downsampling configuration may indicate a manner in which the downsampling is to be performed by the RU 805 (e.g., may indicate an integer factor, a rational factor, and/or one or more filters to be used to perform the downsampling). Additionally, or alternatively, the configuration information may include a bundling configuration. The bundling configuration may indicate one or more physical resource blocks (PRBs) that are to be bundled together for DMRS-based channel estimation. For example, the configuration information may indicate how the RU 805 is to bundle PRBs (e.g., where a single DMRS-based channel estimation is performed for a given bundle of PRBs).

In some aspects, the configuration information may indicate a DMRS to be used by the RU 805 to perform channel estimation. For example, the UE 120 may be configured to transmit multiple DMRSs in the same slot. The DU 810 may indicate which DMRS, of multiple DMRSs included in the same slot, is to be used by the RU 805 to perform channel estimation, as described in more detail elsewhere herein. For example, the DU 810 may indicate one or more DMRSs that are not to be considered by the RU 805 when performing or calculating the channel estimation.

In some aspects, the configuration information may include an indication of one or more metrics or one or more thresholds to be used by the RU 805 to determine pairing information for UEs (e.g., including the UE 120) in the wireless network. For example, as described above, the DU 810 may pair two or more UEs for improved scheduling determinations (e.g., in uplink mMIMO scenarios). The configuration information may include an indication of one or more metrics or one or more thresholds to be used by the RU 805 when comparing spatial information (e.g., beams or other spatial information) associated with different UEs to determine whether the UEs are candidates to be paired together for uplink scheduling purposes. For example, the configuration information may indicate a threshold for correlation (e.g., associated with an interference between two beams) between beams of different UEs for the different UEs to be candidates to be paired together. In some aspects, the configuration information may indicate that the RU 805 is to transmit, to the DU 810, pairing information associated with one or more UEs, including the UE 120, that are suitable to be paired for uplink operations (e.g., may configure the RU 805 to report candidate pairs of UEs to the DU 810, where the candidate pairs of UEs are determined based at least in part on DMRS raw channel estimations associated with the UEs and the one or more metrics or one or more thresholds configured by the DU 810). In some aspects, the DU 810 may transmit, and the RU 805 may receive, an indication of one or more UE identifiers (e.g., to be considered for uplink pairing). The RU 805 may analyze spatial information (e.g., based at least in part on DMRS-based channel estimations associated with the UEs identified by the one or more UE identifiers) to identify suitable UEs to be paired by the DU 810.

In some aspects, the configuration information may indicate information to be transmitted to the UE 120. For example, in some aspects, the RU 805 may transmit, and the UE 120 may receive, configuration information. In some aspects, the configuration information may be defined or configured by the DU 810 (e.g., and transmitted to the RU 805 via the fronthaul interface). In some aspects, the UE 120 may receive the configuration information via one or more of RRC signaling, one or more MAC control elements (MAC-Ces), and/or downlink control information (DCI), among other examples. In some aspects, the configuration information may include an indication of one or more configuration parameters (e.g., already known to the UE 120 and/or previously indicated by the RU 805 or another network entity) for selection by the UE 120, and/or explicit configuration information for the UE 120 to use to configure the UE 120, among other examples.

In some aspects, the configuration information may indicate that the UE is to transmit DMRSs to the RU 805. In some aspects, the configuration information transmitted to the UE 120 may indicate a PUCCH format to be used by the UE 120 (e.g., a PUCCH format 0, 1, 2, 3, 4, or another PUCCH format defined, or otherwise fixed, by the 3GPP). For example, the UE 120 may be configured to use a PUCCH format that includes a DMRS (e.g., multiplexed with uplink control information).

As shown by reference number 820, the UE 120 may transmit, and the RU 805 may receive, an uplink signal including a DMRS. For example, the UE 120 may transmit, and the RU 805 may receive, a DMRS associated with a channel (e.g., the PUSCH or the PUCCH). For example, the UE 120 may transmit a DMRS in an uplink signal via the channel. For example, the UE 120 may transmit the uplink signal (e.g., including the DMRS) in accordance with a DMRS configuration (e.g., transmitted by the RU 805 to the UE 120).

As shown by reference number 825, the RU 805 may perform a channel estimation associated with the channel using the DMRS to obtain channel estimation information. For example, the RU 805 may extract the DMRS from the uplink signal (e.g., based at least in part on time domain resources and/or frequency domain resources associated with the DMRS). The RU 805 may obtain one or more raw channel estimates of the uplink channel based at least in part on the extracted DMRS (e.g., based at least in part on measuring the extracted DMRS). For example, the RU 805 may perform the channel estimation without performing beamforming or port reduction associated with the channel (e.g., the channel estimation information may be raw channel estimation information). In other words, the RU 805 may perform the channel estimation (e.g., may measure the uplink signal received from the UE 120) using a full array (e.g., a full antenna array) associated with the RU 805 (e.g., without narrowing or reducing ports used to measure the uplink signal). The raw channel estimation based at least in part on the DMRS may enable the RU 805 and/or the DU 810 to identify spatial information associated with the UE 120 using the raw channel estimation (e.g., because the channel estimation is performed prior to beamforming or port reduction associated with the uplink signal).

In some aspects, the RU 805 may perform one or more actions to transform the raw channel estimation and/or to obtain additional information based at least in part on the raw channel estimation. For example, the RU 805 may calculate or determine one or more beamforming weights or a beamforming function based at least in part on the DMRS-based raw channel estimation. In some aspects, the RU 805 may compress the one or more DMRS-based raw channel estimates (e.g., in accordance with the compression configuration transmitted by the DU 810). For example, the RU 805 may compress the one or more DMRS-based raw channel estimates in the time domain, frequency domain, spatial domain, and/or resolution domain, among other examples. In some aspects, the compression may apply to a time interval (including the time interval until the next DMRS), a message expected to contain a report, a frequency subband, a set of layers, a set of UEs, or a subset of the channel estimation information parameters, among other examples. In some aspects, compressing the channel estimation information may include refraining from transmitting a report or a report parameter associated with the channel estimation information (e.g., the RU 805 may skip a report or a report parameter in the compression domain), reducing a resource of the report or the report parameter (e.g., the RU 805 may reduce the resolution of a report or report parameter), and/or transmitting a subset of projections of the channel estimation information (e.g., the RU 805 may report a subset of projections of the channel estimate onto a subspace basis), among other examples. As described above, the DU 810 may indicate information and/or spaces to which the compression performed by the RU 805 is to apply (e.g., via the configuration information). In some aspects, the DU 810 may indicate one or more compression techniques or methods that can be used by the RU 805. The RU 805 may select at least one compression technique or method, from the one or more compression techniques or methods, to be used by the RU 805 to compress the one or more DMRS-based raw channel estimates. In some aspects, the DU 810 may restrict the RU 805 to a single compression technique or method.

In some aspects, the RU 805 may downsample the one or more DMRS-based raw channel estimates (e.g., in accordance with the downsampling configuration transmitted by the DU 810). For example, the RU 805 may downsample the one or more DMRS-based raw channel estimates to reduce a rate associated with a signal to be transmitted to the DU 810 that indicates the one or more DMRS-based raw channel estimates. In some aspects, the RU 805 may bundle one or more DMRS-based raw channel estimates for a set of PRBs (e.g., such that a single indication or set of information that is based at least in part on DMRS-based channel estimation is provided to the DU 810 for a given PRB bundle).

In some aspects, the RU 805 may perform one or more discrete Fourier transform (DFT) operations associated with the one or more DMRS-based raw channel estimates. For example, the RU 805 may project the one or more DMRS-based raw channel estimates (or a function of the one or more DMRS-based raw channel estimates) to a DFT basis (e.g., that is indicated by the DU 810 to the RU 805, such as in the configuration information). The RU 805 may obtain one or more indices of DFT beams and/or weights associated with the DFT beams.

As shown by reference number 830, the RU 805 may transmit, and the DU 810 may receive, information that is based at least in part on the channel estimation information. For example, in some cases, the RU 805 may transmit, and the DU 810 may receive, an indication of one or more DMRS-based raw channel estimates associated with an uplink channel. In some aspects, the information that is based at least in part on the channel estimation information may include a function of the one or more DMRS-based raw channel estimates associated with an uplink channel. For example, the information may include the channel estimation information (e.g., one or more DMRS-based raw channel estimates), a downsampling of the channel estimation information, a compressed version of the channel estimation information (e.g., compressed in the time domain, frequency domain, spatial domain, and/or resolution domain), a channel estimate (e.g., a DMRS-based raw channel estimate) for one or more PRB bundles, or a beamforming function (or one or more beamforming weights) that is based at least in part on the channel estimation information, among other examples. In some aspects, the information may include one or more DFT indices or weights that are based at least in part on the channel estimation information.

In some aspects, the RU 805 may transmit, and the DU 810 may receive, the information (e.g., information that is based on the DMRS-based raw channel estimate) via a user plane (U-plane) interface between the RU 805 and the DU 810. Alternatively, the RU 805 may transmit, and the DU 810 may receive, the information (e.g., information that is based on the DMRS-based raw channel estimate) via a control plane (C-plane) interface between the RU 805 and the DU 810. In such examples, a procedure (e.g., a command procedure) may be defined, added, and/or updated (e.g., by a wireless communication standard, such as the 3GPP or the O-RAN Alliance) associated with the RU 805 reporting the information that is based on DMRS-based raw channel estimate to the DU 810 via the C-plane of the fronthaul interface.

In some aspects, the RU 805 may determine one or more candidate pairs of UEs (e.g., to be paired together for uplink operations). For example, the RU 805 may receive DMRSs and/or uplink signals from multiple UEs and may perform DMRS-based channel estimation using the DMRSs and/or uplink signals in a similar manner as described above. As a result, the RU 805 may determine spatial information associated with the multiple UEs (e.g., based at least in part on the DMRS-base raw channel estimate information), such as beams associated with the multiple UEs. The RU 805 may use the spatial information associated with the multiple UEs to identify one or more candidate pairs of UEs.

For example, the RU 805 may use the one or more metrics and/or the one or more thresholds configured by the DU 810 to identify the one or more candidate pairs of UEs. The RU 805 may transmit, and the DU 810 may receive, pairing information associated with one or more UEs, including the UE 120, that are suitable to be paired for uplink operations (e.g., for co-scheduling by the DU 810 or for other uplink operations). For example, the RU 805 may transmit, and the DU 810 may receive, a list of suitable UEs which can be paired in the uplink. The RU 805 may determine the list of suitable UEs which can be paired in the uplink based at least in part on DMRS-based raw channel estimate information associated with respective UEs. As described in more detail elsewhere herein, the DU 810 may use the list of suitable UEs which can be paired in the uplink to configure one or more pairs of UEs (e.g., the list may be refined and/or analyzed by the DU 810). In some aspects, the RU 805 may determine the list of suitable UEs which can be paired in the uplink from a set of configured UEs (e.g., the DU 810 may indicate a set of UE identifiers to be considered by the RU 805 when determining the pairing information). The RU 805 may transmit, and the DU 810 may receive, pairing information associated with the one or more UE identifiers (e.g., configured by the DU 810) indicating UEs that are suitable to be paired for uplink operations.

As shown by reference number 835, the DU 810 may perform one or more actions based at least in part on the information (e.g., received from the RU 805) that is based at least in part on the DMRS channel estimation (e.g., the DMRS-based raw channel estimation). For example, the information (e.g., received from the RU 805) that is based at least in part on the DMRS channel estimation may facilitate UE pairing determinations associated with uplink operations, scheduling determinations, and/or PUCCH beamforming, among other examples.

For example, an action performed by the DU 810 may include transmitting (e.g., to the RU 805) scheduling information for the UE 120, where the scheduling information is based at least in part on the DMRS channel estimation. Additionally, or alternatively, the action may include configuring a pairing of two or more UEs, including the UE, for uplink operations based at least in part on the DMRS channel estimation. For example, the DU 810 may determine to pair two or more UEs based at least in part on spatial information (e.g., beam information) that is identified from the information provided by the RU 805 (e.g., as described in connection with reference number 830). For example, the DU 810 may configure one or more pairs of UEs for the uplink operations based at least in part on the pairing information transmitted by the RU 805. Using DMRS-based raw channel estimation information to determine the pairing of UEs for uplink operations may improve scheduling for the network because the DU 810 may be enabled to accurately and efficiently pair UEs (e.g., for co-scheduling and/or multiplexing of uplink signals) using up-to-date channel information (e.g., rather than relying on an SRS-based channel estimation that may be outdated).

In some aspects, the functional split between the RU 805 and the DU 810 (e.g., as depicted and described in connection with FIG. 9) may be extended to the PUCCH (e.g., the functional split 7-2x for O-RAN may be extended to the PUCCH) using the DMRS-based raw channel estimations. For example, the DU 810 may configure one or more beams or one or more beamforming weights for the UE 120 associated with the PUCCH based at least in part on the DMRS channel estimation. For example, the DU 810 (or the RU 805) may determine one or more beamforming weights for the PUCCH based at least in part on one or more DMRS-based raw channel estimates. For example, the channel used to transmit the DMRS by the UE 120 may be the PUCCH, and the DMRS associated with the DMRS channel estimation may be associated with a PUCCH format that includes the DMRS (e.g., PUCCH format 1, PUCCH format 2, PUCCH format 3, PUCCH format 4, or another PUCCH format that includes a DMRS multiplexed with a UCI payload). As another example, the DMRS-based channel estimation performed by the RU 805 may be based at least in part on a DMRS transmitted via a PUSCH message that is multiplexed with a PUCCH message (e.g., in the same slot). The RU 805 may use the DMRS-based channel estimation performed by the RU 805 that is based at least in part on a DMRS transmitted via the PUSCH to enhance PUCCH beamforming (e.g., when the DMRS is multiplexed with a PUCCH message in the same slot).

For example, the DU 810 may transmit, and the RU 805 may receive, an indication of the one or more beams and/or the one or more beamforming weights associated with the PUCCH and the UE 120. The UE 120 may transmit, and the RU 805 may receive, a PUCCH message using a beam that is beamformed based at least in part on the information that is based at least in part on the channel estimation information (e.g., that is beamformed using the DMRS-based raw channel estimation). This may improve PUCCH detection and/or decoding (e.g., by the RU 805 and/or the DU 810)

because the PUCCH message may be beamformed using a beamforming function or one or more beamforming weights that are based at least in part on the DMRS-based channel estimation (e.g., rather than relying on downlink beamforming weights to perform the PUCCH beamforming).

In some aspects, the action performed by the DU 810 may include configuring one or more downlink beams based at least in part on the information that is based at least in part on the DMRS channel estimation. For example, the DU 810 may supplement the downlink beamforming weights (e.g., that are determined using SRS-based channel estimation) using the information associated with the DMRS-based raw channel estimation. This may improve the determination of the downlink beamforming weights by the DU 810. In some aspects, the DU 810 may transmit, and the RU 805 may receive, an indication of the downlink beamforming weights. The RU 805 may transmit, and the UE 120 may receive, a downlink message using a beam that is beamformed based at least in part on the information that is based at least in part on the DMRS-based channel estimation information.

As a result, uplink channel management may be improved by enabling DMRS-based channel estimations that use a full antenna array of the RU 805 (e.g., without performing beamforming or port reduction) to be provided to the DU 810. The DMRS-based channel estimations may improve determinations or actions made by the DU 810 because the DMRS-based channel estimations may be based on more recent channel conditions (e.g., because DMRSs may be transmitted more frequently by UEs than other reference signals, such as SRSs). Additionally, this may reduce a signaling overhead associated with other reference signals, such as an SRS, because the network may not need the other reference signals to be transmitted by UEs as frequently (e.g., because the determinations are made based at least in part on DMRSs transmitted by the UEs). As a result of reducing the signaling overhead (e.g., an SRS signaling overhead), data throughput over the uplink channel may be improved. Additionally, uplink channel detection and/or decoding may be improved because the DMRS-based channel estimations may enable improved beamforming determinations or calculations for an uplink channel (e.g., the PUSCH and/or the PUCCH).

As indicated above, FIG. 8 is provided as an example. Other examples may differ from what is described with regard to FIG. 8.

Figure 9:
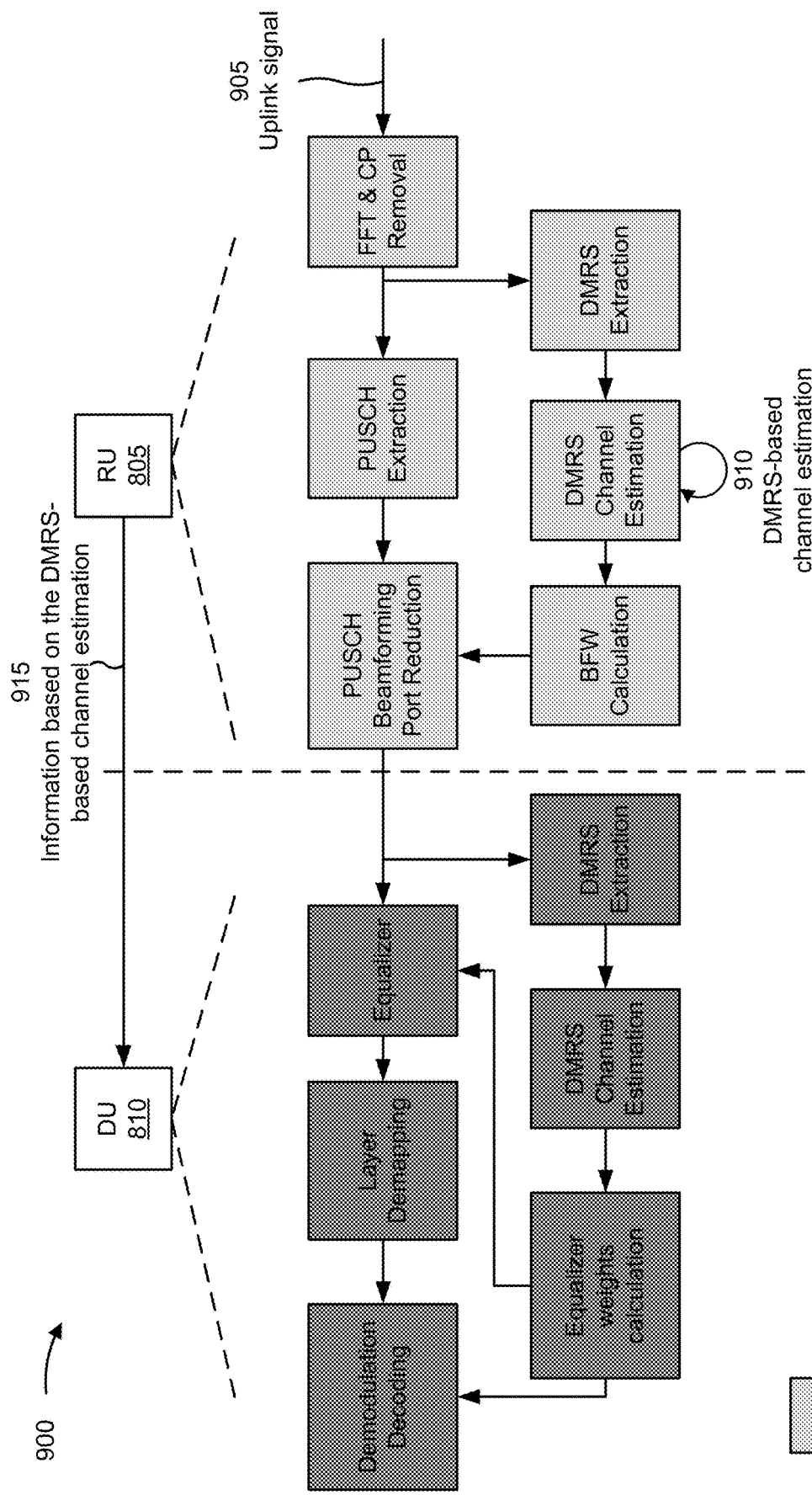
FIG. 9 is a diagram illustrating an example of an enhanced fronthaul interface functional split for uplink communications, in accordance with the present disclosure.

FIG. 9 is a diagram illustrating an example 900 of an enhanced fronthaul interface functional split for uplink communications, in accordance with the present disclosure. The functional split depicted in FIG. 9 may be an enhancement of a 7-2 (e.g., 7-2x) functional split as defined, or otherwise fixed, by a wireless communication standard, such as the 3GPP or the O-RAN Alliance. The fronthaul interface functional split may define operations performed by an RU (e.g., the RU 805) and a DU (e.g., the DU 810) for uplink communications. In some aspects, the fronthaul interface functional split may be defined, or otherwise fixed, by a wireless communication standard, such as the 3GPP or the O-RAN Alliance, among other examples. The blocks depicted in FIG. 9 represent operations and/or modules that may be implemented via or more hardware components of the RU 805 or the DU 810. The functional split is depicted in FIG. 9 by the vertical dashed line. For example, an arrow crossing the dashed line, as depicted in FIG. 9, may be associated with a transmission over a fronthaul interface (e.g., between the RU 805 and the DU 810). Additionally, arrows that do not cross the dashed line may refer to internal operations of a given device (e.g., the RU 805 or the DU 810).

As shown by reference number 905, the RU 805 may receive an uplink signal (e.g., in a similar manner as described above in connection with reference number 820). The uplink signal may be transmitted via the PUSCH or the PUCCH. As shown by reference number 910, the RU 805 may perform DMRS channel estimation before performing beamforming associated with the uplink signal (e.g., to obtain a full dimensional or raw channel estimate), in a similar manner as described above in connection with reference number 825.

As shown in FIG. 9, the RU 805 may use the DMRS-based full dimensional or raw channel estimate to calculate one or more beamforming weights (e.g., for the PUSCH and/or for the PUCCH). Additionally, or alternatively, the RU 805 may use the DMRS-based full dimensional or raw channel estimate to perform one or more other actions, as described in more detail elsewhere herein.

The RU 805 may perform PUSCH beamforming or port reduction using the DMRS-based full dimensional or raw channel estimate and/or the one or more beamforming weights. For example, a full dimensional uplink signal may include R streams. The beamforming or port reduction may be performed in accordance with $G_{L \times R} = F_1(Cov_{R \times R}^{nn}) * F_2(H_{R \times Ntx}^{raw})$, where $Cov_{R \times R}^{nn}$ is a covariance matrix of noise plus interference, $H_{R \times ntx}^{raw}$ is the DMRS-based channel estimate, and $F_1$ and $F_2$ are functions. An input to the equalizer of the DU 810 may be L streams, where $\mu \le L < R$, where $\mu$ is a quantity of layers associated with the uplink signal.

As shown by reference number 915, the RU 805 may transmit, and the DU 810 may receive, information that is based at least in part on the DMRS-based channel estimation (e.g., in a similar manner as described above in connection with reference number 830). In some aspects, the information transmitted by the RU 805 to the DU 810 may be $F_2(H_{R \times Ntx}^{raw})$ and/or $H_{R \times Ntx}^{raw}$. The DU 810 may use the information provided by the RU 805 to determine one or more UE pairings, one or more scheduling determinations, and/or PUCCH beamforming calculations, among other examples.

As indicated above, FIG. 9 is provided as an example. Other examples may differ from what is described with regard to FIG. 9.

Figure 10:
FIG. 10 is a diagram illustrating an example process performed, for example, by a radio unit, in accordance with the present disclosure.

FIG. 10 is a diagram illustrating an example process 1000 performed, for example, by an RU, in accordance with the present disclosure. Example process 1000 is an example where the RU (e.g., the RU 140, the RU 340, and/or the RU 805) performs operations associated with an enhanced fronthaul interface split using DMRS channel estimates.

As shown in FIG. 10, in some aspects, process 1000 may include receiving, from a UE, a DMRS associated with a channel (block 1010). For example, the RU (e.g., using communication manager 160 and/or reception component 1202, depicted in FIG. 12) may receive, from a UE, a DMRS associated with a channel, as described above.

As further shown in FIG. 10, in some aspects, process 1000 may include performing a channel estimation associated with the channel using the DMRS to obtain channel estimation information (block 1020). For example, the RU (e.g., using communication manager 160 and/or channel estimation component 1208, depicted in FIG. 12) may perform a channel estimation associated with the channel using the DMRS to obtain channel estimation information, as described above.

As further shown in FIG. 10, in some aspects, process 1000 may include transmitting, to a DU, information that is based at least in part on the channel estimation information (block 1030). For example, the RU (e.g., using communication manager 160 and/or transmission component 1204, depicted in FIG. 12) may transmit, to a DU, information that is based at least in part on the channel estimation information, as described above.

Process 1000 may include additional aspects, such as any single aspect or any combination of aspects described below and/or in connection with one or more other processes described elsewhere herein.

In a first aspect, performing the channel estimation comprises performing the channel estimation before performing beamforming associated with the channel, wherein the channel estimation information is full dimensional channel estimation information.

In a second aspect, alone or in combination with the first aspect, the information that is based at least in part on the channel estimation information includes at least one of the channel estimation information, a downsampling of the channel estimation information, a compressed version of the channel estimation information, a channel estimate for one or more PRB bundles, or a beamforming function that is based at least in part on the channel estimation information.

In a third aspect, alone or in combination with one or more of the first and second aspects, the compressed version of the channel estimation information is compressed in at least one of a time domain, a frequency domain, a spatial domain, or a resolution domain.

In a fourth aspect, alone or in combination with one or more of the first through third aspects, the compressed version of the channel estimation information is associated with a compression associated with at least one of a time interval, a message associated with a report, a frequency subband, a set of layers, a set of UEs, or a subset of parameters associated with the channel estimation information.

In a fifth aspect, alone or in combination with one or more of the first through fourth aspects, process 1000 includes compressing the channel estimation information to obtain the compressed version of the channel estimation information, wherein compressing the channel estimation information includes at least one of refraining from transmitting a report or a report parameter associated with the channel estimation information, reducing a resource of the report or the report parameter, or transmitting a subset of projections of the channel estimation information.

In a sixth aspect, alone or in combination with one or more of the first through fifth aspects, process 1000 includes receiving, from the DU, configuration information associated with DMRS channel estimation, wherein transmitting the information that is based at least in part on the channel estimation information is in accordance with the configuration information.

In a seventh aspect, alone or in combination with one or more of the first through sixth aspects, receiving the configuration information comprises receiving the configuration information via a control plane or a management plane.

In an eighth aspect, alone or in combination with one or more of the first through seventh aspects, the configuration information includes at least one of a compression configuration, a downsampling configuration, or a bundling configuration.

In a ninth aspect, alone or in combination with one or more of the first through eighth aspects, the information that is based at least in part on the channel estimation information includes one or more DFT indices or weights that are based at least in part on the channel estimation information.

In a tenth aspect, alone or in combination with one or more of the first through ninth aspects, transmitting the information that is based at least in part on the channel estimation information comprises transmitting the information via a user plane (U-plane) interface between the RU and the DU.

In an eleventh aspect, alone or in combination with one or more of the first through tenth aspects, transmitting the information that is based at least in part on the channel estimation information comprises transmitting the information via a control plane (C-plane) interface between the RU and the DU.

In a twelfth aspect, alone or in combination with one or more of the first through eleventh aspects, process 1000 includes receiving, from the DU, an indication of one or more UE identifiers, and transmitting, to the DU, pairing information associated with the one or more UE identifiers indicating UEs that are suitable to be paired for uplink operations, wherein the pairing information is based at least in part on DMRS channel estimation information associated with the one or more UEs.

In a thirteenth aspect, alone or in combination with one or more of the first through twelfth aspects, process 1000 includes receiving, from the DU, an indication of one or more metrics or one or more thresholds to be used by the RU to determine the pairing information.

In a fourteenth aspect, alone or in combination with one or more of the first through thirteenth aspects, the channel is a PUCCH, and the DMRS is associated with a PUCCH format that includes the DMRS.

In a fifteenth aspect, alone or in combination with one or more of the first through fourteenth aspects, process 1000 includes receiving, from the UE, a PUCCH message using a beam that is beamformed based at least in part on the information that is based at least in part on the channel estimation information.

In a sixteenth aspect, alone or in combination with one or more of the first through fifteenth aspects, process 1000 includes transmitting, to the UE, a downlink message using a beam that is beamformed based at least in part on the information that is based at least in part on the channel estimation information.

In a seventeenth aspect, alone or in combination with one or more of the first through sixteenth aspects, the information that is based at least in part on the channel estimation information is associated with facilitating at least one of UE pairing determinations associated with uplink operations, scheduling determinations, or PUCCH beamforming.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
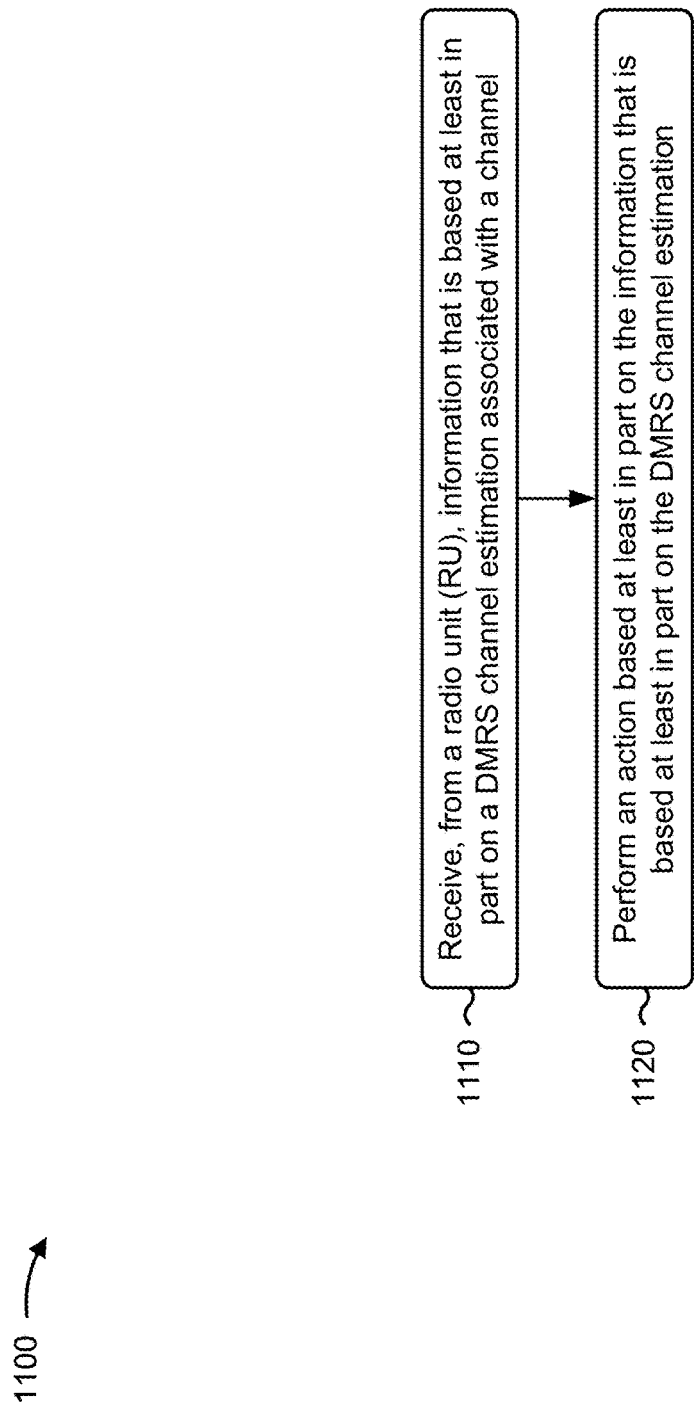
FIG. 11 is a diagram illustrating an example process performed, for example, by a distributed unit, in accordance with the present disclosure.

FIG. 11 is a diagram illustrating an example process 1100 performed, for example, by a DU, in accordance with the present disclosure. Example process 1100 is an example where the DU (e.g., the DU 150, the DU 330, and/or the DU 810) performs operations associated with an enhanced fronthaul interface split using DMRS channel estimates.

As shown in FIG. 11, in some aspects, process 1100 may include receiving, from an RU, information that is based at least in part on a DMRS channel estimation associated with a channel (block 1110). For example, the DU (e.g., using communication manager 170 and/or reception component 1302, depicted in FIG. 13) may receive, from an RU, information that is based at least in part on a DMRS channel estimation associated with a channel, as described above.

As further shown in FIG. 11, in some aspects, process 1100 may include performing an action based at least in part on the information that is based at least in part on the DMRS channel estimation (block 1120). For example, the DU (e.g., using communication manager 170 and/or performing component 1308, depicted in FIG. 13) may perform an action based at least in part on the information that is based at least in part on the DMRS channel estimation, as described above.

Process 1100 may include additional aspects, such as any single aspect or any combination of aspects described below and/or in connection with one or more other processes described elsewhere herein.

In a first aspect, the DMRS channel estimation is a full dimensional DMRS channel estimation.

In a second aspect, alone or in combination with the first aspect, the information that is based at least in part on the DMRS channel estimation includes at least one of the DMRS channel estimation, a downsampling of the DMRS channel estimation, a compressed version of the DMRS channel estimation, a DMRS channel estimate for one or more PRB bundle, or a beamforming function that is based at least in part on the DMRS channel estimation.

In a third aspect, alone or in combination with one or more of the first and second aspects, the compressed version of the DMRS channel estimation is compressed in at least one of a time domain, a frequency domain, a spatial domain, or a resolution domain.

In a fourth aspect, alone or in combination with one or more of the first through third aspects, the compressed version of the channel estimation information is associated with a compression associated with at least one of a time interval, a message associated with a report, a frequency subband, a set of layers, a set of UEs, or a subset of parameters associated with the channel estimation information.

In a fifth aspect, alone or in combination with one or more of the first through fourth aspects, process 1100 includes transmitting, to the RU, configuration information associated with the DMRS channel estimation, wherein receiving the information that is based at least in part on the DMRS channel estimation is in accordance with the configuration information.

In a sixth aspect, alone or in combination with one or more of the first through fifth aspects, transmitting the configuration information comprises transmitting the configuration information via a control plane or a management plane.

In a seventh aspect, alone or in combination with one or more of the first through sixth aspects, the configuration information includes at least one of a compression configuration, a downsampling configuration, or a bundling configuration.

In an eighth aspect, alone or in combination with one or more of the first through seventh aspects, the information that is based at least in part on the DMRS channel estimation includes one or more DFT indices or weights that are based at least in part on the DMRS channel estimation.

In a ninth aspect, alone or in combination with one or more of the first through eighth aspects, receiving the information that is based at least in part on the DMRS channel estimation comprises receiving the information via a user plane (U-plane) interface between the RU and the DU.

In a tenth aspect, alone or in combination with one or more of the first through ninth aspects, receiving the information that is based at least in part on the DMRS channel estimation comprises receiving the information via a control plane (C-plane) interface between the RU and the DU.

In an eleventh aspect, alone or in combination with one or more of the first through tenth aspects, process 1100 includes transmitting, to the RU, an indication of one or more UE identifiers receiving, from the RU, pairing information associated with the one or more UE identifiers indicating UEs that are suitable to be paired for uplink operations, wherein the pairing information is based at least in part on DMRS channel estimation information associated with the one or more UEs.

In a twelfth aspect, alone or in combination with one or more of the first through eleventh aspects, performing the action comprises configuring one or more pairs of UEs for the uplink operations based at least in part on the pairing information.

In a thirteenth aspect, alone or in combination with one or more of the first through twelfth aspects, process 1100 includes transmitting, to the RU, an indication of one or more metrics or one or more thresholds to be used by the RU to determine the pairing information.

In a fourteenth aspect, alone or in combination with one or more of the first through thirteenth aspects, the channel is a PUCCH, and a DMRS associated with the DMRS channel estimation is associated with a PUCCH format that includes the DMRS.

In a fifteenth aspect, alone or in combination with one or more of the first through fourteenth aspects, the channel is a PUCCH, and performing the action comprises configuring one or more beams for a UE for the PUCCH based at least in part on the information that is based at least in part on the DMRS channel estimation.

In a sixteenth aspect, alone or in combination with one or more of the first through fifteenth aspects, performing the action comprises configuring one or more downlink beams based at least in part on the information that is based at least in part on the DMRS channel estimation.

In a seventeenth aspect, alone or in combination with one or more of the first through sixteenth aspects, the information that is based at least in part on the DMRS channel estimation is associated with facilitating at least one of UE pairing determinations associated with uplink operations, scheduling determinations, or PUCCH beamforming.

In an eighteenth aspect, alone or in combination with one or more of the first through seventeenth aspects, the DMRS channel estimation is associated with a UE, and performing the action comprises transmitting scheduling information for the UE, wherein the scheduling information is based at least in part on the DMRS channel estimation.

In a nineteenth aspect, alone or in combination with one or more of the first through eighteenth aspects, the DMRS channel estimation is associated with a UE, and performing the action comprises configuring a pairing of two or more UEs, including the UE, for uplink operations based at least in part on the DMRS channel estimation.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
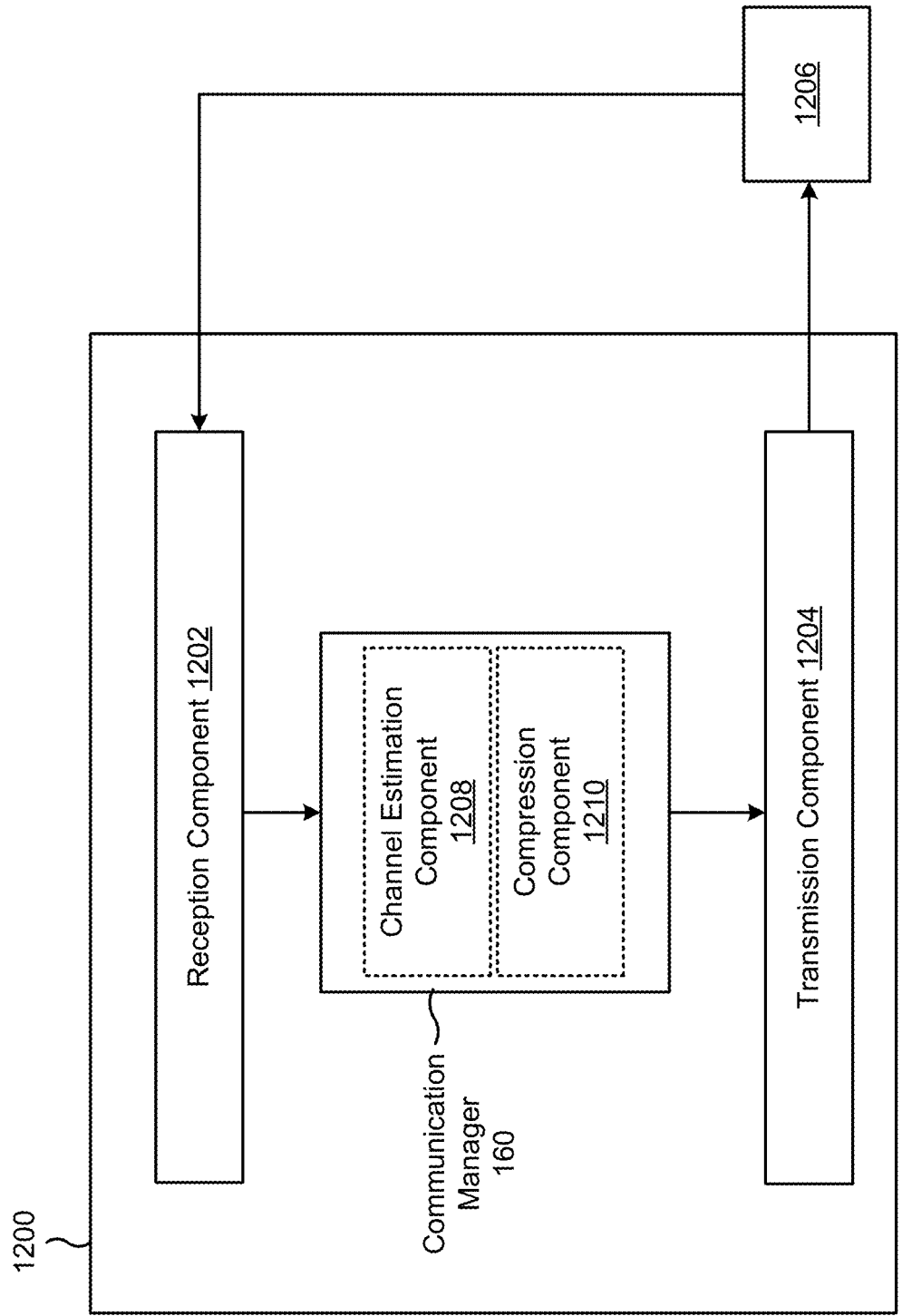
FIG. 12 is a diagram of an example apparatus for wireless communication.

FIG. 12 is a diagram of an example apparatus 1200 for wireless communication. The apparatus 1200 may be an RU, or an RU may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, a network entity, or another wireless communication device) using the reception component 1202 and the transmission component 1204. As further shown, the apparatus 1200 may include the communication manager 160. The communication manager 160 may include one or more of a channel estimation component 1208, and/or a compression component 1210, among other examples.

In some aspects, the apparatus 1200 may be configured to perform one or more operations described herein in connection with FIGS. 8 and 9. Additionally, or alternatively, the apparatus 1200 may be configured to perform one or more processes described herein, such as process 1000 of FIG. 10, or a combination thereof. In some aspects, the apparatus 1200 and/or one or more components shown in FIG. 12 may include one or more components of the RU described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the RU or the base station described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the RU or the base station described in connection with FIG. 2. In some aspects, the transmission component 1204 may be co-located with the reception component 1202 in a transceiver.

The reception component 1202 may receive, from a UE, a DMRS associated with a channel. The channel estimation component 1208 may perform a channel estimation associated with the channel using the DMRS to obtain channel estimation information. The transmission component 1204 may transmit, to a DU, information that is based at least in part on the channel estimation information.

The compression component 1210 may compress the channel estimation information to obtain the compressed version of the channel estimation information, wherein compressing the channel estimation information includes at least one of refraining from transmitting a report or a report parameter associated with the channel estimation information, reducing a resource of the report or the report parameter, or transmitting a subset of projections of the channel estimation information.

The reception component 1202 may receive, from the DU, configuration information associated with DMRS channel estimation, wherein transmitting the information that is based at least in part on the channel estimation information is in accordance with the configuration information.

The reception component 1202 may receive, from the DU, an indication of one or more UE identifiers.

The transmission component 1204 may transmit, to the DU, pairing information associated with the one or more UE identifiers indicating UEs that are suitable to be paired for uplink operations, wherein the pairing information is based at least in part on DMRS channel estimation information associated with the one or more UEs.

The reception component 1202 may receive, from the DU, an indication of one or more metrics or one or more thresholds to be used by the RU to determine the pairing information.

The reception component 1202 may receive, from the UE, a PUCCH message using a beam that is beamformed based at least in part on the information that is based at least in part on the channel estimation information.

The transmission component 1204 may transmit, to the UE, a downlink message using a beam that is beamformed based at least in part on the information that is based at least in part on the channel estimation information.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
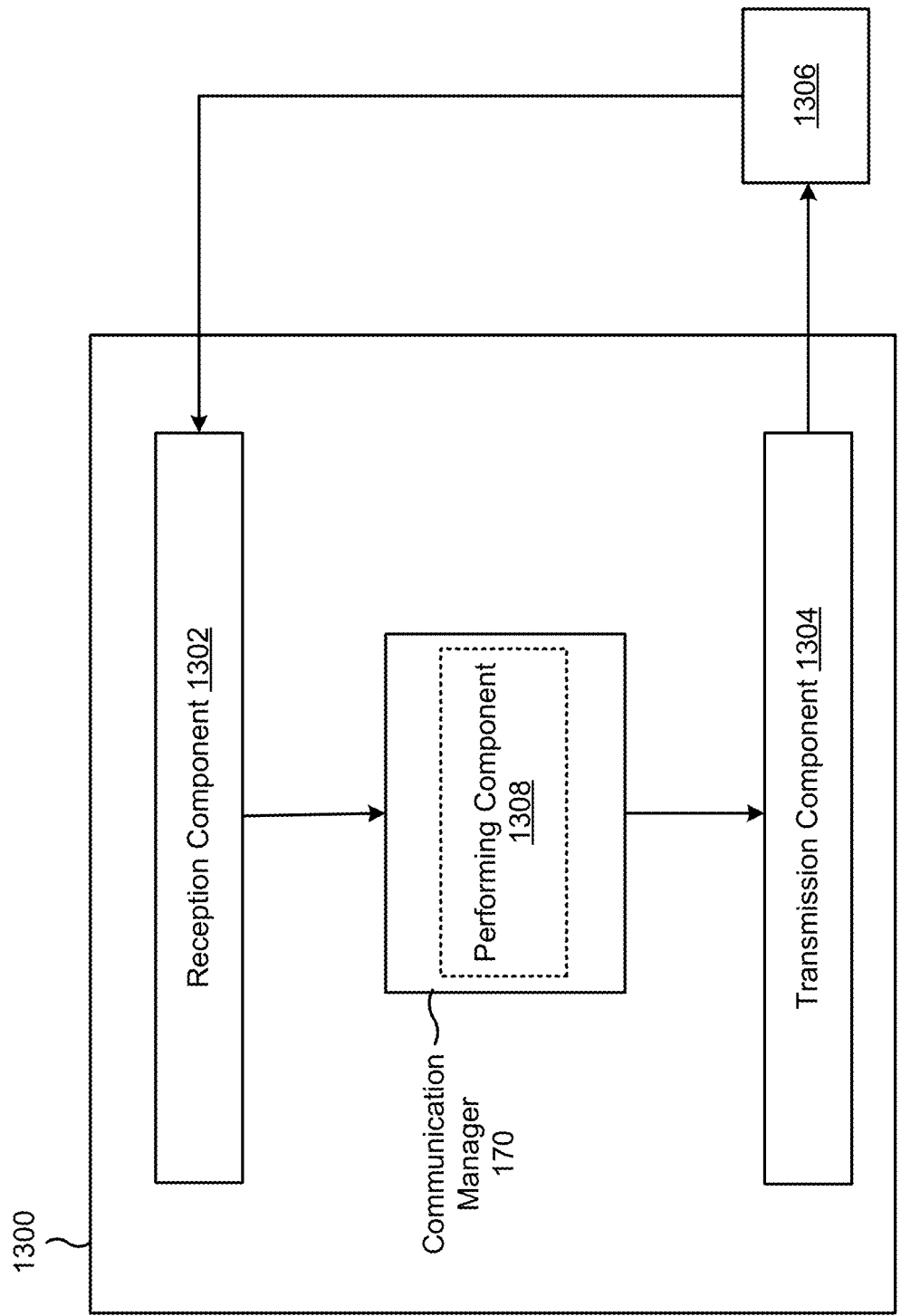
FIG. 13 is a diagram of an example apparatus for wireless communication.

FIG. 13 is a diagram of an example apparatus 1300 for wireless communication. The apparatus 1300 may be a DU, or a DU may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, a network entity, or another wireless communication device) using the reception component 1302 and the transmission component 1304. As further shown, the apparatus 1300 may include the communication manager 170. The communication manager 170 may include a performing component 1308, among other examples.

In some aspects, the apparatus 1300 may be configured to perform one or more operations described herein in connection with FIGS. 8 and 9. Additionally, or alternatively, the apparatus 1300 may be configured to perform one or more processes described herein, such as process 1100 of FIG. 11, or a combination thereof. In some aspects, the apparatus 1300 and/or one or more components shown in FIG. 13 may include one or more components of the DU or the base station described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the DU or the base station described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the DU or the base station described in connection with FIG. 2. In some aspects, the transmission component 1304 may be co-located with the reception component 1302 in a transceiver.

The reception component 1302 may receive, from an RU, information that is based at least in part on a DMRS channel estimation associated with a channel. The performing component 1308 may perform an action based at least in part on the information that is based at least in part on the DMRS channel estimation.

The transmission component 1304 may transmit, to the RU, configuration information associated with the DMRS channel estimation, wherein receiving the information that is based at least in part on the DMRS channel estimation is in accordance with the configuration information.

The transmission component 1304 may transmit, to the RU, an indication of one or more UE identifiers.

The reception component 1302 may receive, from the RU, pairing information associated with the one or more UE identifiers indicating UEs that are suitable to be paired for uplink operations, wherein the pairing information is based at least in part on DMRS channel estimation information associated with the one or more UEs.

The transmission component 1304 may transmit, to the RU, an indication of one or more metrics or one or more thresholds to be used by the RU to determine the pairing information.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a radio unit (RU), comprising: receiving, from a user equipment (UE), a demodulation reference signal (DMRS) associated with a channel; performing a channel estimation associated with the channel using the DMRS to obtain channel estimation information; and transmitting, to a distributed unit (DU), information that is based at least in part on the channel estimation information.

Aspect 2: The method of Aspect 1, wherein performing the channel estimation comprises: performing the channel estimation before performing beamforming associated with the channel, wherein the channel estimation information is full dimensional channel estimation information.

Aspect 3: The method of any of Aspects 1-2, wherein the information that is based at least in part on the channel estimation information includes at least one of: the channel estimation information, a downsampling of the channel estimation information, a compressed version of the channel estimation information, a channel estimate for one or more physical resource block (PRB) bundles, or a beamforming function that is based at least in part on the channel estimation information.

Aspect 4: The method of Aspect 3, wherein the compressed version of the channel estimation information is compressed in at least one of: a time domain, a frequency domain, a spatial domain, or a resolution domain.

Aspect 5: The method of any of Aspects 3-4, wherein the compressed version of the channel estimation information is associated with a compression associated with at least one of: a time interval, a message associated with a report, a frequency subband, a set of layers, a set of UEs, or a subset of parameters associated with the channel estimation information.

Aspect 6: The method of any of Aspects 3-5, further comprising: compressing the channel estimation information to obtain the compressed version of the channel estimation information, wherein compressing the channel estimation information includes at least one of: refraining from transmitting a report or a report parameter associated with the channel estimation information, reducing a resource of the report or the report parameter, or transmitting a subset of projections of the channel estimation information.

Aspect 7: The method of any of Aspects 1-6, further comprising: receiving, from the DU, configuration information associated with DMRS channel estimation, wherein transmitting the information that is based at least in part on the channel estimation information is in accordance with the configuration information.

Aspect 8: The method of Aspect 7, wherein receiving the configuration information comprises receiving the configuration information via a control plane or a management plane.

Aspect 9: The method of any of Aspects 7-8, wherein the configuration information includes at least one of: a compression configuration, a downsampling configuration, or a bundling configuration.

Aspect 10: The method of any of Aspects 1-9, wherein the information that is based at least in part on the channel estimation information includes one or more discrete Fourier transform (DFT) indices or weights that are based at least in part on the channel estimation information.

Aspect 11: The method of any of Aspects 1-10, wherein transmitting the information that is based at least in part on the channel estimation information comprises: transmitting the information via a user plane (U-plane) interface between the RU and the DU.

Aspect 12: The method of any of Aspects 1-10, wherein transmitting the information that is based at least in part on the channel estimation information comprises: transmitting the information via a control plane (C-plane) interface between the RU and the DU.

Aspect 13: The method of any of Aspects 1-12, further comprising: receiving, from the DU, an indication of one or more UE identifiers; and transmitting, to the DU, pairing information associated with the one or more UE identifiers indicating UEs that are suitable to be paired for uplink operations, wherein the pairing information is based at least in part on DMRS channel estimation information associated with the one or more UEs.

Aspect 14: The method of Aspect 13, further comprising: receiving, from the DU, an indication of one or more metrics or one or more thresholds to be used by the RU to determine the pairing information.

Aspect 15: The method of any of Aspects 1-14, wherein the channel is a physical uplink control channel (PUCCH), and wherein the DMRS is associated with a PUCCH format that includes the DMRS.

Aspect 16: The method of any of Aspects 1-15, further comprising: receiving, from the UE, a physical uplink control channel (PUCCH) message using a beam that is beamformed based at least in part on the information that is based at least in part on the channel estimation information.

Aspect 17: The method of any of Aspects 1-16, further comprising: transmitting, to the UE, a downlink message using a beam that is beamformed based at least in part on the information that is based at least in part on the channel estimation information.

Aspect 18: The method of any of Aspects 1-17, wherein the information that is based at least in part on the channel estimation information is associated with facilitating at least one of: UE pairing determinations associated with uplink operations, scheduling determinations, or physical uplink control channel (PUCCH) beamforming.

Aspect 19: A method of wireless communication performed by a distributed unit (DU), comprising: receiving, from a radio unit (RU), information that is based at least in part on a demodulation reference signal (DMRS) channel estimation associated with a channel; and performing an action based at least in part on the information that is based at least in part on the DMRS channel estimation.

Aspect 20: The method of Aspect 19, wherein the DMRS channel estimation is a full dimensional DMRS channel estimation.

Aspect 21: The method of any of Aspects 19-20, wherein the information that is based at least in part on the DMRS channel estimation includes at least one of: the DMRS channel estimation, a downsampling of the DMRS channel estimation, a compressed version of the DMRS channel estimation, a DMRS channel estimate for one or more physical resource block (PRB) bundle, or a beamforming function that is based at least in part on the DMRS channel estimation.

Aspect 22: The method of Aspect 21, wherein the compressed version of the DMRS channel estimation is compressed in at least one of: a time domain, a frequency domain, a spatial domain, or a resolution domain.

Aspect 23: The method of any of Aspects 21-22, wherein the compressed version of the channel estimation information is associated with a compression associated with at least one of: a time interval, a message associated with a report, a frequency subband, a set of layers, a set of user equipments (UEs), or a subset of parameters associated with the channel estimation information.

Aspect 24: The method of any of Aspects 19-23, further comprising: transmitting, to the RU, configuration information associated with the DMRS channel estimation, wherein receiving the information that is based at least in part on the DMRS channel estimation is in accordance with the configuration information.

Aspect 25: The method of Aspect 24, wherein transmitting the configuration information comprises transmitting the configuration information via a control plane or a management plane.

Aspect 26: The method of any of Aspects 24-25, wherein the configuration information includes at least one of: a compression configuration, a downsampling configuration, or a bundling configuration.

Aspect 27: The method of any of Aspects 19-26, wherein the information that is based at least in part on the DMRS channel estimation includes one or more discrete Fourier transform (DFT) indices or weights that are based at least in part on the DMRS channel estimation.

Aspect 28: The method of any of Aspects 19-27, wherein receiving the information that is based at least in part on the DMRS channel estimation comprises: receiving the information via a user plane (U-plane) interface between the RU and the DU.

Aspect 29: The method of any of Aspects 19-27, wherein receiving the information that is based at least in part on the DMRS channel estimation comprises: receiving the information via a control plane (C-plane) interface between the RU and the DU.

Aspect 30: The method of any of Aspects 19-29, further comprising: transmitting, to the RU, an indication of one or more user equipment (UE) identifiers receiving, from the RU, pairing information associated with the one or more UE identifiers indicating UEs that are suitable to be paired for uplink operations, wherein the pairing information is based at least in part on DMRS channel estimation information associated with the one or more UEs.

Aspect 31: The method of Aspect 30, wherein performing the action comprises: configuring one or more pairs of UEs for the uplink operations based at least in part on the pairing information.

Aspect 32: The method of any of Aspects 30-31, further comprising: transmitting, to the RU, an indication of one or more metrics or one or more thresholds to be used by the RU to determine the pairing information.

Aspect 33: The method of any of Aspects 19-32, wherein the channel is a physical uplink control channel (PUCCH), and wherein a DMRS associated with the DMRS channel estimation is associated with a PUCCH format that includes the DMRS.

Aspect 34: The method of any of Aspects 19-33, wherein the channel is a physical uplink control channel (PUCCH), and wherein performing the action comprises: configuring one or more beams for a user equipment (UE) for the PUCCH based at least in part on the information that is based at least in part on the DMRS channel estimation.

Aspect 35: The method of any of Aspects 19-34, wherein performing the action comprises: configuring one or more downlink beams based at least in part on the information that is based at least in part on the DMRS channel estimation.

Aspect 36: The method of any of Aspects 19-35, wherein the information that is based at least in part on the DMRS channel estimation is associated with facilitating at least one of: UE pairing determinations associated with uplink operations, scheduling determinations, or physical uplink control channel (PUCCH) beamforming.

Aspect 37: The method of any of Aspects 19-36, wherein the DMRS channel estimation is associated with a user equipment (UE), and wherein performing the action comprises: transmitting scheduling information for the UE, wherein the scheduling information is based at least in part on the DMRS channel estimation.

Aspect 38: The method of any of Aspects 19-37, wherein the DMRS channel estimation is associated with a user equipment (UE), and wherein performing the action comprises: configuring a pairing of two or more UEs, including the UE, for uplink operations based at least in part on the DMRS channel estimation.

Aspect 39: An apparatus for wireless communication at a device, comprising a processor; memory coupled with the processor; and instructions stored in the memory and executable by the processor to cause the apparatus to perform the method of one or more of Aspects 1-18.

Aspect 40: A device for wireless communication, comprising a memory and one or more processors coupled to the memory, the one or more processors configured to perform the method of one or more of Aspects 1-18.

Aspect 41: An apparatus for wireless communication, comprising at least one means for performing the method of one or more of Aspects 1-18.

Aspect 42: A non-transitory computer-readable medium storing code for wireless communication, the code comprising instructions executable by a processor to perform the method of one or more of Aspects 1-18.

Aspect 43: A non-transitory computer-readable medium storing a set of instructions for wireless communication, the set of instructions comprising one or more instructions that, when executed by one or more processors of a device, cause the device to perform the method of one or more of Aspects 1-18.

Aspect 44: An apparatus for wireless communication at a device, comprising a processor; memory coupled with the processor; and instructions stored in the memory and executable by the processor to cause the apparatus to perform the method of one or more of Aspects 19-37.

Aspect 45: A device for wireless communication, comprising a memory and one or more processors coupled to the memory, the one or more processors configured to perform the method of one or more of Aspects 19-37.

Aspect 46: An apparatus for wireless communication, comprising at least one means for performing the method of one or more of Aspects 19-37.

Aspect 47: A non-transitory computer-readable medium storing code for wireless communication, the code comprising instructions executable by a processor to perform the method of one or more of Aspects 19-37.

Aspect 48: A non-transitory computer-readable medium storing a set of instructions for wireless communication, the set of instructions comprising one or more instructions that, when executed by one or more processors of a device, cause the device to perform the method of one or more of Aspects 19-37.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A radio unit (RU) for wireless communication, comprising:
a memory; and
one or more processors, coupled to the memory, configured to:
receive, from a user equipment (UE), a demodulation reference signal (DMRS) associated with a channel;
receive, from a distributed unit (DU), an indication of one or more UE identifiers;
perform a channel estimation associated with the channel using the DMRS to obtain channel estimation information; and
transmit, to the DU, information that is based at least in part on the channel estimation information, wherein the information comprises pairing information associated with the one or more UE identifiers indicating one or more UEs that are suitable to be paired for uplink operations, wherein the pairing information is based at least in part on the channel estimation information.

2. The RU of claim 1, wherein the one or more processors, to perform the channel estimation, are configured to:
perform the channel estimation before performing beamforming associated with the channel, wherein the channel estimation information is full dimensional channel estimation information.

3. The RU of claim 1, wherein the information that is based at least in part on the channel estimation information includes at least one of:
the channel estimation information,
a downsampling of the channel estimation information,
a compressed version of the channel estimation information,
a channel estimate for one or more physical resource block (PRB) bundles, or
a beamforming function that is based at least in part on the channel estimation information.

4. The RU of claim 3, wherein the one or more processors are further configured to:
compress the channel estimation information to obtain the compressed version of the channel estimation information, wherein compressing the channel estimation information includes at least one of:
refrain from transmitting a report or a report parameter associated with the channel estimation information,
reduce a resource of the report or the report parameter, or
transmit a subset of projections of the channel estimation information.

5. The RU of claim 1, wherein the one or more processors are further configured to:
receive, from the DU, configuration information associated with DMRS channel estimation, wherein transmitting the information that is based at least in part on the channel estimation information is in accordance with the configuration information.

6. The RU of claim 1, wherein the information that is based at least in part on the channel estimation information includes one or more discrete Fourier transform (DFT) indices or weights that are based at least in part on the channel estimation information.

7. The RU of claim 1, wherein the one or more processors are further configured to:
receive, from the DU, an indication of one or more metrics or one or more thresholds to be used by the RU to determine the pairing information.

8. The RU of claim 1, wherein the one or more processors are further configured to:
communicate, with the UE, using a beam that is beamformed based at least in part on the information that is based at least in part on the channel estimation information.

9. The RU of claim 1, wherein the information that is based at least in part on the channel estimation information is associated with facilitating at least one of:
scheduling determinations, or
physical uplink control channel (PUCCH) beamforming.

10. A distributed unit (DU) for wireless communication, comprising:
a memory; and
one or more processors, coupled to the memory, configured to:
transmit, to a radio unit (RU), an indication of one or more UE identifiers;
receive, from the RU, information that is based at least in part on a demodulation reference signal (DMRS) channel estimation associated with a channel, wherein the information comprises pairing information associated with the one or more UE identifiers indicating one or more UEs that are suitable to be paired for uplink operations, wherein the pairing information is based at least in part on the DMRS channel estimation; and
perform an action based at least in part on the information that is based at least in part on the DMRS channel estimation.

11. The DU of claim 10, wherein the DMRS channel estimation is a full dimensional DMRS channel estimation.

12. The DU of claim 10, wherein the information that is based at least in part on the DMRS channel estimation includes at least one of:
a downsampling of the DMRS channel estimation,
a compressed version of the DMRS channel estimation,
a DMRS channel estimate for one or more physical resource block (PRB) bundle, or
a beamforming function that is based at least in part on the DMRS channel estimation.

13. The DU of claim 10, wherein the DMRS channel estimation is associated with a user equipment (UE), and wherein the one or more processors, to perform the action, are configured to:
transmit scheduling information for the UE, wherein the scheduling information is based at least in part on the DMRS channel estimation.

14. The DU of claim 10, wherein the DMRS channel estimation is associated with a user equipment (UE), and wherein the one or more processors, to perform the action, are configured to:
 configure a pairing of two or more UEs, including the UE, for uplink operations based at least in part on the DMRS channel estimation.

15. A method of wireless communication performed by a radio unit (RU), comprising:
 receiving, from a user equipment (UE), a demodulation reference signal (DMRS) associated with a channel;
 receiving, from a distributed unit (DU), an indication of one or more UE identifiers;
 performing a channel estimation associated with the channel using the DMRS to obtain channel estimation information; and
 transmitting, to the DU, information that is based at least in part on the channel estimation information, wherein the information comprises pairing information associated with the one or more UE identifiers indicating one or more UEs that are suitable to be paired for uplink operations, wherein the pairing information is based at least in part on the channel estimation information.

16. The method of claim 15, wherein performing the channel estimation comprises:
 performing the channel estimation before performing beamforming associated with the channel, wherein the channel estimation information is full dimensional channel estimation information.

17. The method of claim 15, wherein the information that is based at least in part on the channel estimation information includes at least one of:
 a downsampling of the channel estimation information,
 a compressed version of the channel estimation information,
 a channel estimate for one or more physical resource block (PRB) bundles, or
 a beamforming function that is based at least in part on the channel estimation information.

18. The method of claim 17, wherein the compressed version of the channel estimation information is associated with a compression associated with at least one of:
 a time interval,
 a message associated with a report,
 a frequency subband,
 a set of layers,
 a set of UEs, or
 a subset of parameters associated with the channel estimation information.

19. The method of claim 15, further comprising:
 receiving, from the DU, configuration information associated with DMRS channel estimation, wherein transmitting the information that is based at least in part on the channel estimation information is in accordance with the configuration information.

20. The method of claim 15, wherein the information that is based at least in part on the channel estimation information includes one or more discrete Fourier transform (DFT) indices or weights that are based at least in part on the channel estimation information.

21. The method of claim 15, further comprising:
 receiving, from the UE, a physical uplink control channel (PUCCH) message using a beam that is beamformed based at least in part on the information that is based at least in part on the channel estimation information.

22. The method of claim 15, further comprising:
 transmitting, to the UE, a downlink message using a beam that is beamformed based at least in part on the information that is based at least in part on the channel estimation information.

23. A method of wireless communication performed by a distributed unit (DU), comprising:
 transmitting, to a radio unit (RU), an indication of one or more UE identifiers;
 receiving, from the RU, information that is based at least in part on a demodulation reference signal (DMRS) channel estimation associated with a channel, wherein the information comprises pairing information associated with the one or more UE identifiers indicating one or more UEs that are suitable to be paired for uplink operations, wherein the pairing information is based at least in part on the DMRS channel estimation; and
 performing an action based at least in part on the information that is based at least in part on the DMRS channel estimation.

24. The method of claim 23, wherein the DMRS channel estimation is a full dimensional DMRS channel estimation.

25. The method of claim 23, further comprising:
 transmitting, to the RU, configuration information associated with the DMRS channel estimation, wherein receiving the information that is based at least in part on the DMRS channel estimation is in accordance with the configuration information.

26. The method of claim 25, wherein the configuration information includes at least one of:
 a compression configuration,
 a downsampling configuration, or
 a bundling configuration.

27. The method of claim 23, wherein performing the action comprises:
 configuring one or more pairs of UEs for the uplink operations based at least in part on the pairing information.

* * * * *